United States Patent
Shikari et al.

(10) Patent No.: US 10,966,248 B2
(45) Date of Patent: Mar. 30, 2021

(54) COEXISTENCE FEATURES FOR CELLULAR COMMUNICATION IN UNLICENSED SPECTRUM

(71) Applicant: Apple Inc., Cupertino, CA (US)

(72) Inventors: Murtaza A. Shikari, Mountain View, CA (US); Hariharan Sukumar, San Diego, CA (US); An Chan, San Jose, CA (US); Srirang A. Lovlekar, Cupertino, CA (US); Vijay Venkataraman, Sunnyvale, CA (US); Srinivas Burugupalli, Union City, CA (US); Srinivasan Nimmala, San Jose, CA (US)

(73) Assignee: Apple Inc., Cupertino, CA (US)

( * ) Notice: Subject to any disclaimer, the term of this patent is extended or adjusted under 35 U.S.C. 154(b) by 69 days.

(21) Appl. No.: 16/144,507

(22) Filed: Sep. 27, 2018

(65) Prior Publication Data

US 2019/0132876 A1    May 2, 2019

Related U.S. Application Data

(60) Provisional application No. 62/580,365, filed on Nov. 1, 2017, provisional application No. 62/613,699, filed on Jan. 4, 2018.

(51) Int. Cl.
| | |
|---|---|
| *H04W 74/08* | (2009.01) |
| *H04W 72/04* | (2009.01) |
| *H04W 72/10* | (2009.01) |
| *H04W 16/14* | (2009.01) |
| *H04W 72/12* | (2009.01) |

(52) U.S. Cl.
CPC ....... *H04W 74/0816* (2013.01); *H04W 16/14* (2013.01); *H04W 72/0453* (2013.01); *H04W 72/10* (2013.01); *H04W 72/1215* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 9,445,278 B2 | 9/2016 | Sadek | |
| 9,491,632 B2 | 11/2016 | Sadek | |
| 2008/0192692 A1* | 8/2008 | Chari | ...................... H04L 47/10 370/331 |

(Continued)

*Primary Examiner* — Otis L Thompson, Jr.
(74) *Attorney, Agent, or Firm* — Kowert, Hood, Munyon, Rankin & Goetzel, P.C.

(57) ABSTRACT

This disclosure relates to providing coexistence features for cellular communication in unlicensed spectrum. A wireless device may communicate with a cellular base station in accordance with an original communication configuration. The wireless device may determine that a communication activity is occurring at the wireless device that has a duration longer than a duration threshold. The wireless device may provide an indication to the cellular base station to modify the communication configuration with respect to operation in an unlicensed frequency band based at least in part on determining that a communication activity is occurring at the wireless device that has a duration longer than the duration threshold. The wireless device may communicate with the cellular base station in accordance with a modified communication configuration.

19 Claims, 20 Drawing Sheets

(56) References Cited

U.S. PATENT DOCUMENTS

| | | | |
|---|---|---|---|
| 2013/0143502 A1* | 6/2013 | Kazmi | H04W 88/06 |
| | | | 455/62 |
| 2013/0208587 A1 | 8/2013 | Bala | |
| 2014/0140314 A1* | 5/2014 | Wei | H04W 48/12 |
| | | | 370/329 |
| 2014/0378157 A1* | 12/2014 | Wei | H04W 16/14 |
| | | | 455/454 |
| 2016/0044516 A1* | 2/2016 | Hedayat | H04W 16/14 |
| | | | 370/329 |
| 2016/0219589 A1* | 7/2016 | Khawer | H04W 72/0453 |
| 2016/0373235 A1* | 12/2016 | Oh | H04L 1/18 |
| 2016/0380665 A1* | 12/2016 | Lee | H04B 1/18 |
| | | | 455/552.1 |
| 2017/0041950 A1* | 2/2017 | Wang | H04W 28/08 |
| 2017/0201902 A1* | 7/2017 | Chen | H04W 28/0247 |
| 2017/0238188 A1* | 8/2017 | Youtz | H04W 16/14 |
| | | | 455/454 |
| 2017/0289817 A1* | 10/2017 | Shekalim | H04W 24/08 |
| 2017/0339568 A1* | 11/2017 | Wang | H04W 16/14 |
| 2018/0070372 A1* | 3/2018 | Yi | H04W 72/06 |
| 2018/0098224 A1* | 4/2018 | Sun | H04W 72/0413 |
| 2018/0124643 A1 | 5/2018 | Gupta | |
| 2018/0199346 A1* | 7/2018 | Hou | H04W 4/70 |
| 2018/0206260 A1* | 7/2018 | Khoryaev | H04W 72/1242 |
| 2019/0261363 A1* | 8/2019 | Park | H04L 5/0048 |
| 2019/0281507 A1* | 9/2019 | Rahat | H04W 36/14 |
| 2019/0373481 A1* | 12/2019 | Lee | H04W 16/14 |
| 2019/0373482 A1* | 12/2019 | Shekalim | H04W 16/14 |
| 2020/0015092 A1* | 1/2020 | Alderfer | H04W 52/243 |

* cited by examiner

COEXISTENCE FEATURES FOR CELLULAR COMMUNICATION IN UNLICENSED SPECTRUM

PRIORITY INFORMATION

This application claims priority to U.S. provisional patent application Ser. No. 62/580,365, entitled "Coexistence Features for Cellular Communication in Unlicensed Spectrum," filed Nov. 1, 2017, and to U.S. provisional patent application Ser. No. 62/613,699, entitled "Coexistence Features for Cellular Communication in Unlicensed Spectrum," filed Jan. 4, 2018, which are hereby incorporated by reference in their entirety as though fully and completely set forth herein.

FIELD

The present application relates to wireless communications, and more particularly to systems, apparatuses, and methods for providing coexistence features for cellular communication in unlicensed spectrum.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (e.g., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH', etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

In addition to the communication standards mentioned above, there also exist extensions aimed at boosting transmission coverage in certain cellular networks. For example, LTE in Unlicensed spectrum (LTE-U) allows cellular carriers to boost coverage in their cellular networks by transmitting in the unlicensed 5 GHz band, which is also used by many Wi-Fi devices. Licensed Assisted Access (LAA) describes a similar technology aimed to standardize operation of LTE in the Wi-Fi bands through the use of a contention protocol referred to as listen-before-talk (LBT), which facilitates coexistence with other Wi-Fi devices on the same band. However, the coexistence of cellular and Wi-Fi communications in the same band can still result in the degradation of data throughput and/or decreased performance of streaming applications (data streaming) when both Wi-Fi signals and LAA/LTE-U signals are present.

SUMMARY

Embodiments are presented herein of apparatuses, systems, and methods for providing coexistence features for cellular communication in unlicensed spectrum (e.g., LAA/LTE-U communication).

According to the techniques described herein, a wireless device may potentially be aware of when it is using an unlicensed frequency band for cellular communication, when it is using the unlicensed frequency band for Wi-Fi communication, and/or when it is using the unlicensed frequency band for one or more other forms of wireless communication. Based on such awareness of the use by the wireless device of an unlicensed frequency band according to one wireless communication technology, the wireless device may modify its communication activities and/or provide an indication one or more parties with which the wireless device is performing wireless communication to modify their communication activities with the wireless device.

For example, if the wireless device is performing Wi-Fi communication on an unlicensed frequency band and the wireless device also has a cellular carrier configured and activated on the unlicensed frequency band, the wireless device might provide an indication to its serving cellular base station to deactivate the cellular carrier deployed on the unlicensed frequency band. An indication that the carrier could be reactivated could be provided once the Wi-Fi communication is complete.

As another example, if the wireless device is performing a high priority cellular communication (or possibly any cellular communication) on an unlicensed frequency band and the wireless device is also capable of performing Wi-Fi on the unlicensed frequency band, the wireless device might determine not to perform Wi-Fi communication on the unlicensed frequency band. The wireless device might determine that Wi-Fi communication on the unlicensed frequency band can again be performed once the cellular communication on the unlicensed frequency band is complete.

Additionally or alternatively, the wireless device might determine whether it has a preference for performing cellular communication on a carrier that is deployed on a licensed frequency band or on a carrier that is deployed on an unlicensed frequency band based on a priority level of the cellular data being communicated. For example, the wireless device might have a preference for a carrier that is deployed on a licensed frequency band for high priority data, and a preference for a carrier that is deployed on an unlicensed frequency band for low priority data, possibly further dependent on one or more other considerations, such as signal strength/quality, and/or medium availability, on each of the candidate carriers. Whether the wireless device is performing Wi-Fi communication on the unlicensed frequency band could be another such consideration. The wireless device may provide an indication to its serving cellular base station of such a preference if the wireless device determines that it has such a preference.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
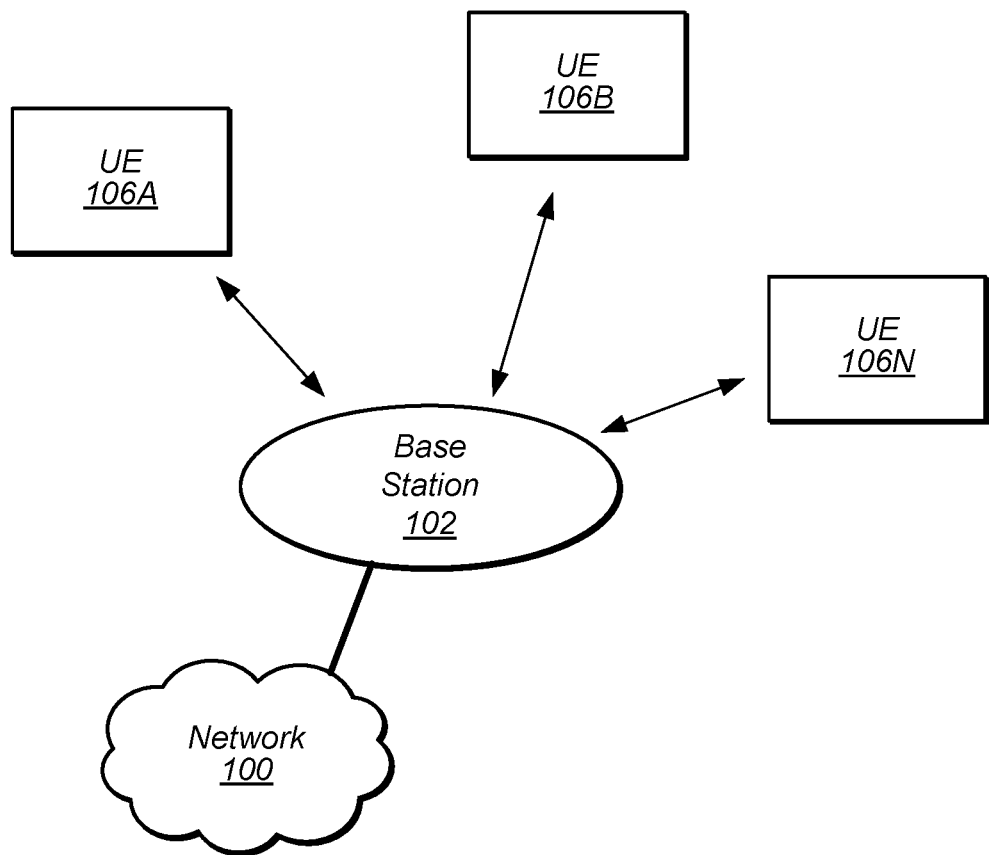
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
UE: User Equipment
RF: Radio Frequency
BS: Base Station
GSM: Global System for Mobile Communication
UMTS: Universal Mobile Telecommunication System
LTE: Long Term Evolution
NR: New Radio
LTE-U: LTE-Unlicensed
LAA: Licensed Assisted Access
TX: Transmission/Transmit
RX: Reception/Receive
LAN: Local Area Network
WLAN: Wireless LAN
LBT: Listen-Before-Talk
AP: Access Point
RAT: Radio Access Technology
IEEE: Institute of Electrical and Electronics Engineers
Wi-Fi: Wireless Local Area Network (WLAN) RAT based on the IEEE 802.11 standards Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
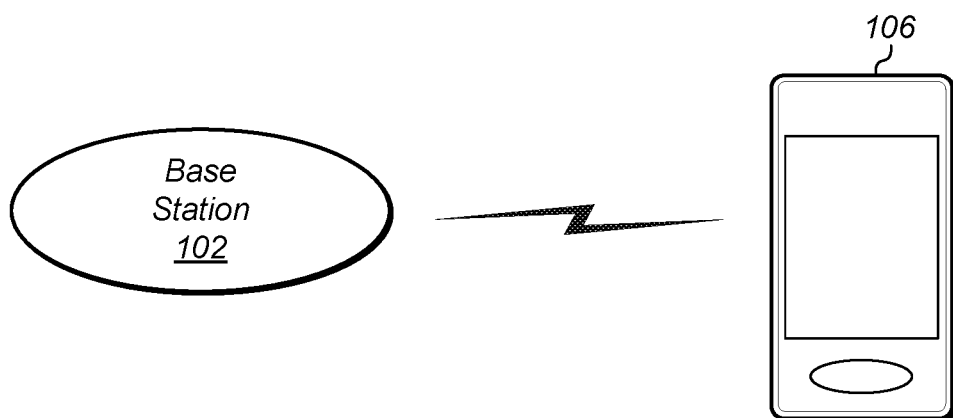
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB'. If the base station 102 is implemented in the context of NR, it may alternately be referred to as an 'gNodeB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, NR, 3GPP2 CDMA2000 (e.g., 1×RTT, 1×EV-DO, HRPD, eHRPD), Wi-Fi, WiMAX etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106 may be configured to implement coexistence features for cellular communication in unlicensed spectrum, at least according to the various methods as described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing).

Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or GSM, or LTE or NR), and separate radios for communicating using each of Wi-Fi and BLUETOOTH'. Other configurations are also possible.

Figure 3:
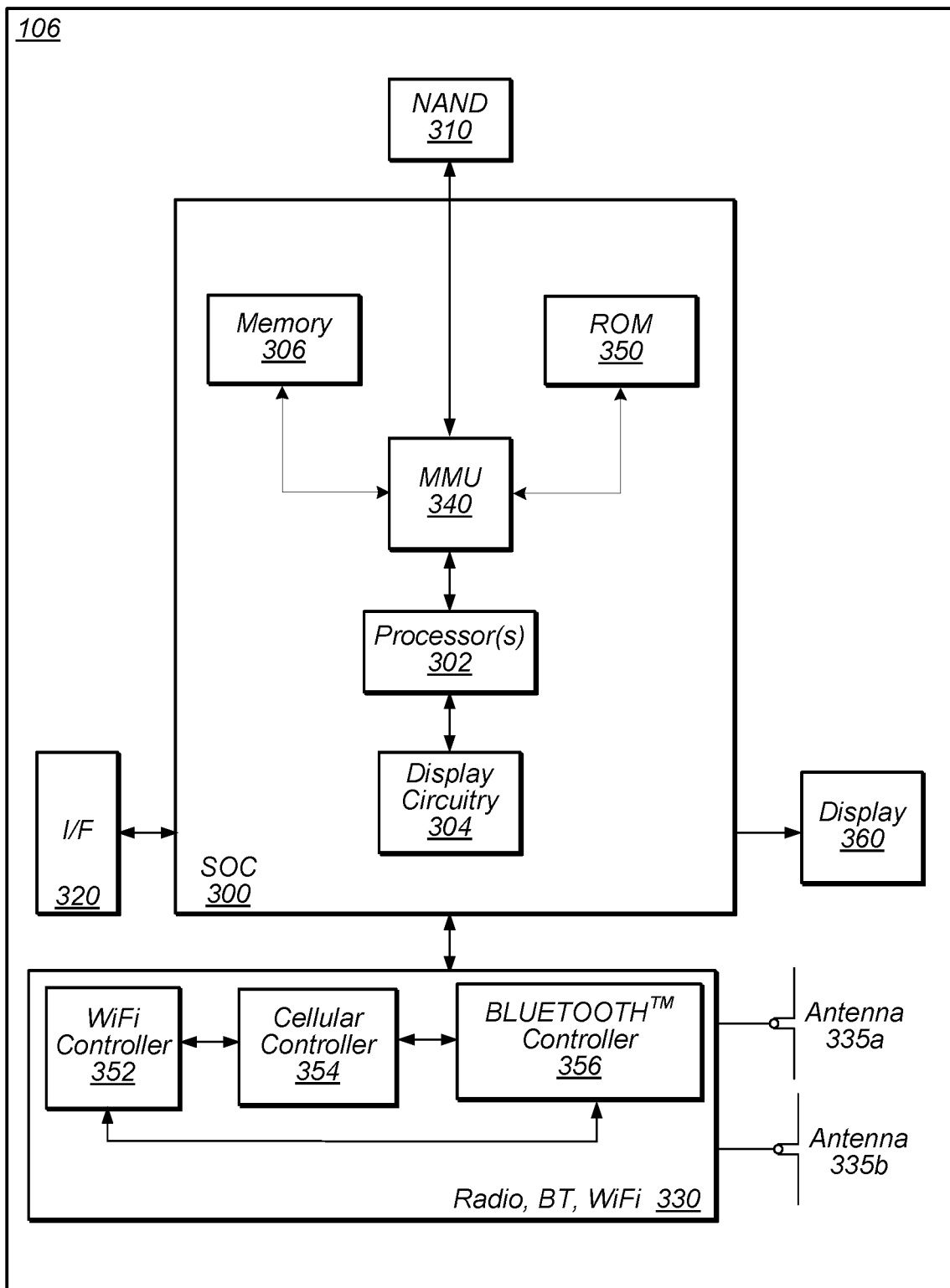
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH', Wi-Fi, NFC, GPS, etc.).

The UE device 106 may include at least one antenna (e.g. 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for providing coexistence features for cellular communication in unlicensed spectrum. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to provide coexistence features for cellular communication in unlicensed spectrum according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE controller) 354, and BLU- ETOOTH' controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH' controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing Wi-Fi preamble detection, e.g., for detecting Wi-Fi physical layer preambles transmitted in unlicensed frequency bands that might be relevant to possible LAA communication by the UE 106. As another possibility, the cellular controller 354 may include hardware and/or software components for generating Wi-Fi physical layer preamble signals, e.g., for transmitting as part of uplink communications by the UE 106 that occur in unlicensed frequency bands.

Figure 4:
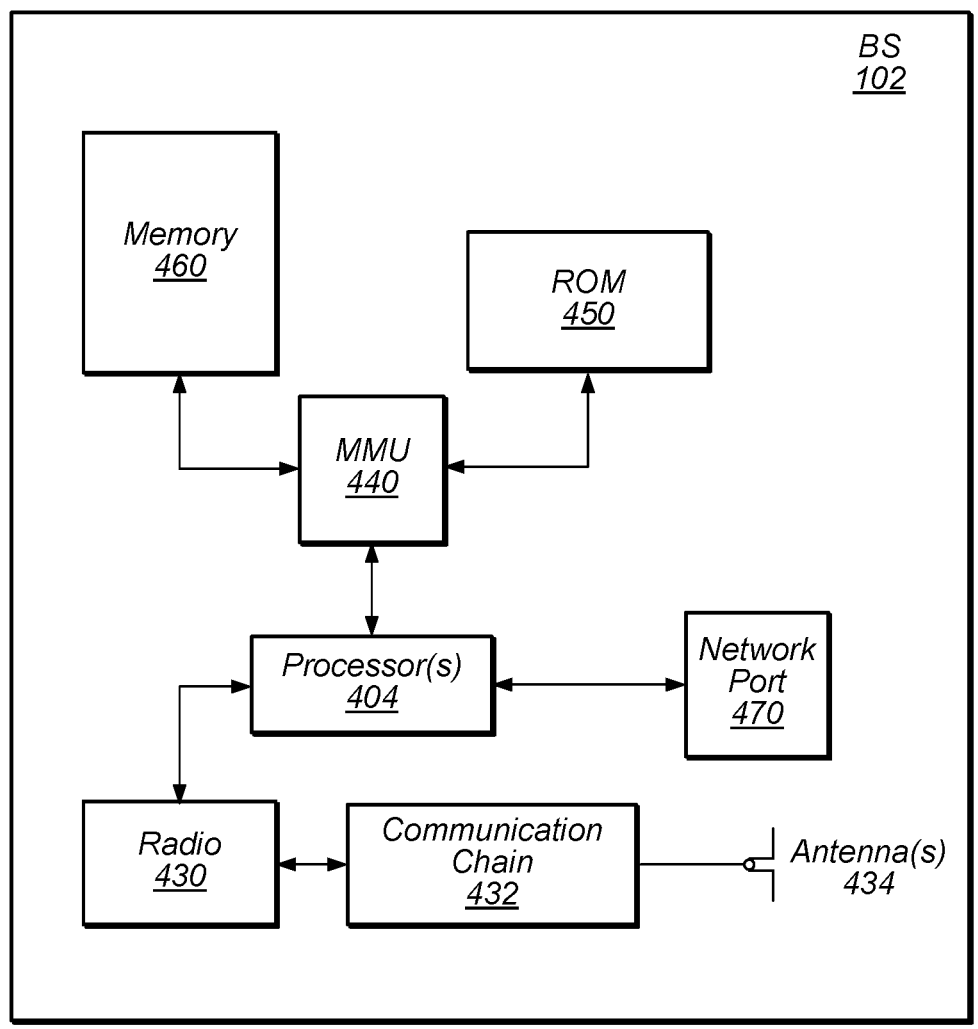
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A, NR, WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard. Base station 102 may operate according to the various methods as disclosed herein for wireless devices to utilize coexistence features for cellular communication in unlicensed spectrum.

Figure 5:
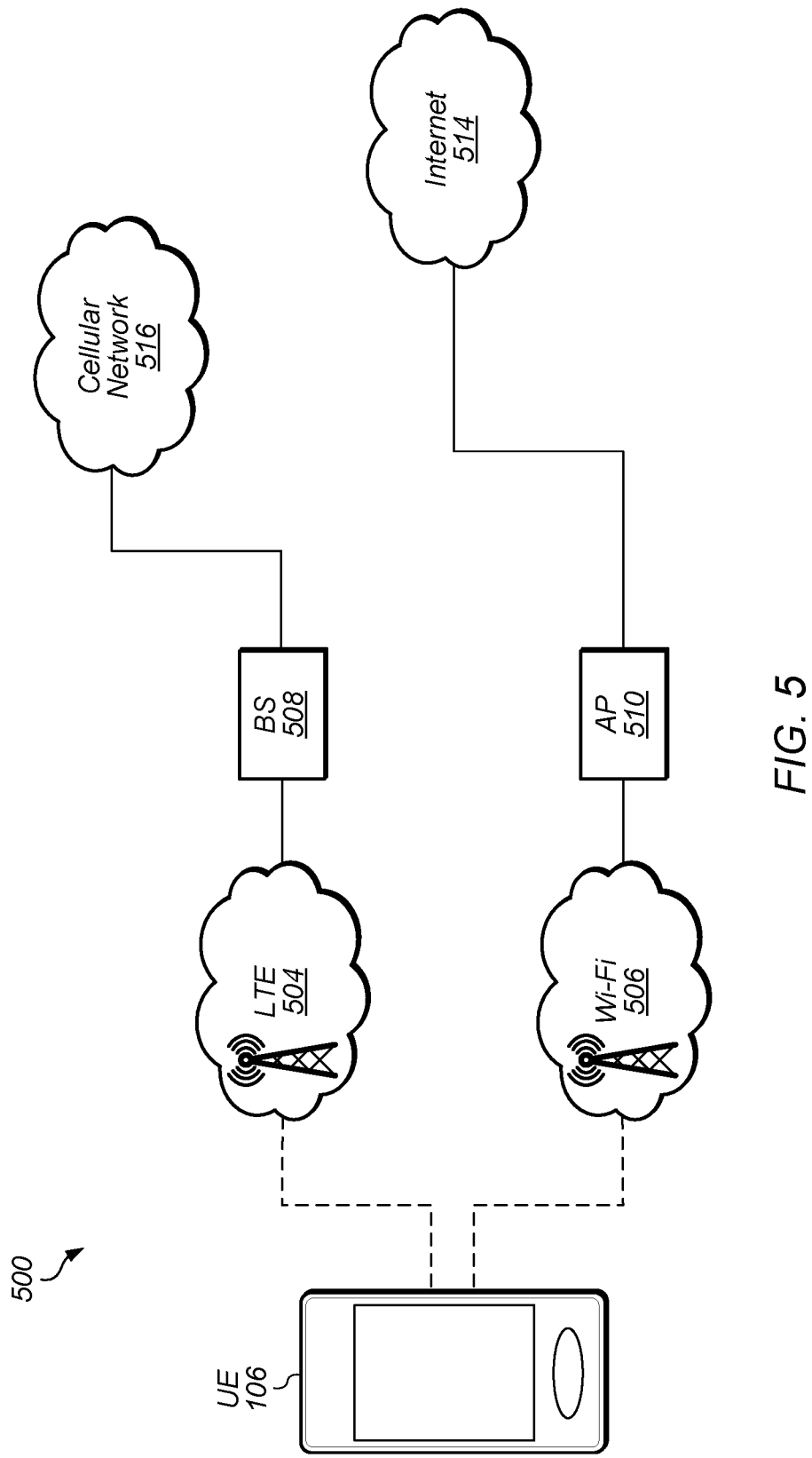
FIG. 5 illustrates an exemplary wireless communication system, according to some embodiments.

FIG. 5—Exemplary Communication System

FIG. 5 illustrates an exemplary wireless communication system 500 in which aspects of the present disclosure may be implemented, according to some embodiments. System 500 is a system in which an LTE access network and a Wi-Fi radio access network are implemented. It is noted that the system 500 of FIG. 5 is merely one example of a possible system, and embodiments may be implemented in any of various systems, as desired.

LTE access network 504 is representative of some embodiments of a first RAT access and Wi-Fi access network 506 is representative of some embodiments of a second RAT access. LTE access network 504 may be interfaced with a broader cellular network (e.g., LTE network) and Wi-Fi access network 506 may be interfaced with the Internet 514. More particularly, LTE access network 504 may be interfaced with a serving base station (BS) 508, which may in turn provide access to broader cellular network 516. The Wi-Fi access network 506 may be interfaced with an access point (AP), which may in turn provide access to the Internet 514. UE 106 may accordingly access Internet 514 via AP 510 and cellular network 516 via LTE access network 504. In some embodiments, though not shown, UE 106 may also access Internet 514 via LTE access network 504. More specifically, LTE access network 504 may be interfaced with a serving gateway, which may in turn be interfaced with a packet data network (PDN) gateway. The PDN gateway may, in turn, be interfaced with Internet 514. UE 106 may accordingly access Internet 514 via either or both of LTE access network 504 and Wi-Fi access network 506.

Figure 6:
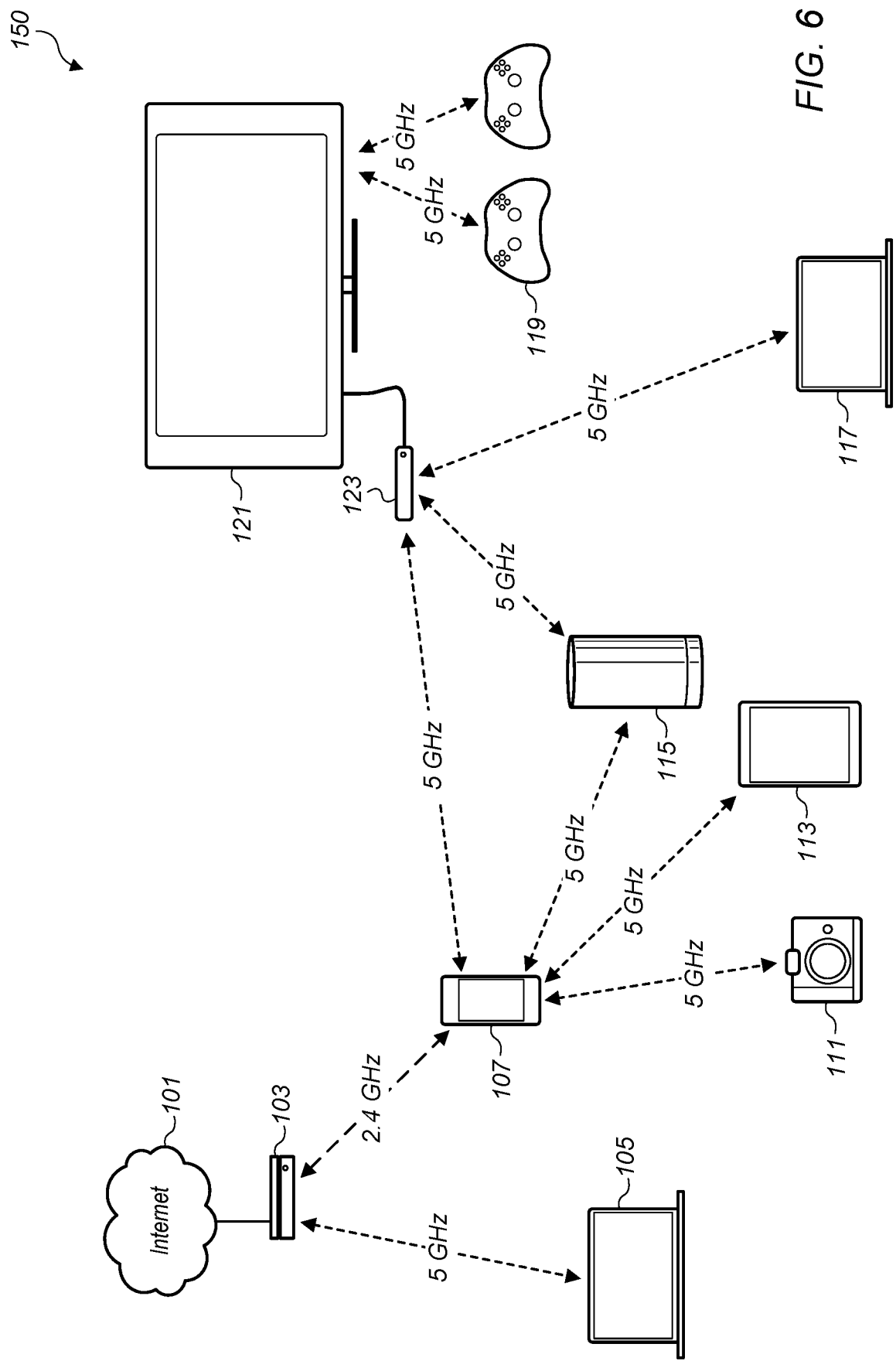
FIG. 6 illustrates an exemplary communication system in which multiple different devices may communicate with each other over specific band, such as 2.4 GHz and/or 5 GHz frequency bands using Wi-Fi, according to some embodiments.

FIG. 6—Exemplary Communication System with Multiple Wi-Fi Devices

FIG. 6 shows an exemplary communication system in which multiple different devices may communicate with each other over a specific band, such as 2.4 GHz and/or 5 GHz frequency bands using Wi-Fi RAT. It is noted that the system of FIG. 6 is merely one example of a possible system, and embodiments may be implemented in any of various systems, as desired.

5 GHz Wi-Fi (e.g., IEEE 802.11 ac/n) capable devices have become quite common, operating in both peer-to-peer mode and/or infrastructure/station mode, as shown in FIG. 6. Data communications over a specific frequency band, e.g., over the 5 GHz band, may include Voice, Video, real time and best effort type of traffic. Illustrated devices include cameras (111), tablets (113), speakers (115), portable computers (105, 117), access ports/routers (103), game controllers (119), mobile devices such as smart phones (107), and smart monitors (121) or monitors with wireless access interface (121 together with media processing devices 123). As shown in FIG. 6, many of the devices may communicate over the 5 GHz band, using Wi-Fi communication technology. In some cases the Wi-Fi communications conducted by the devices may affect and/or be affected by LAA/LTE-U communications also taking place over the 5 GHz band.

Figure 7:
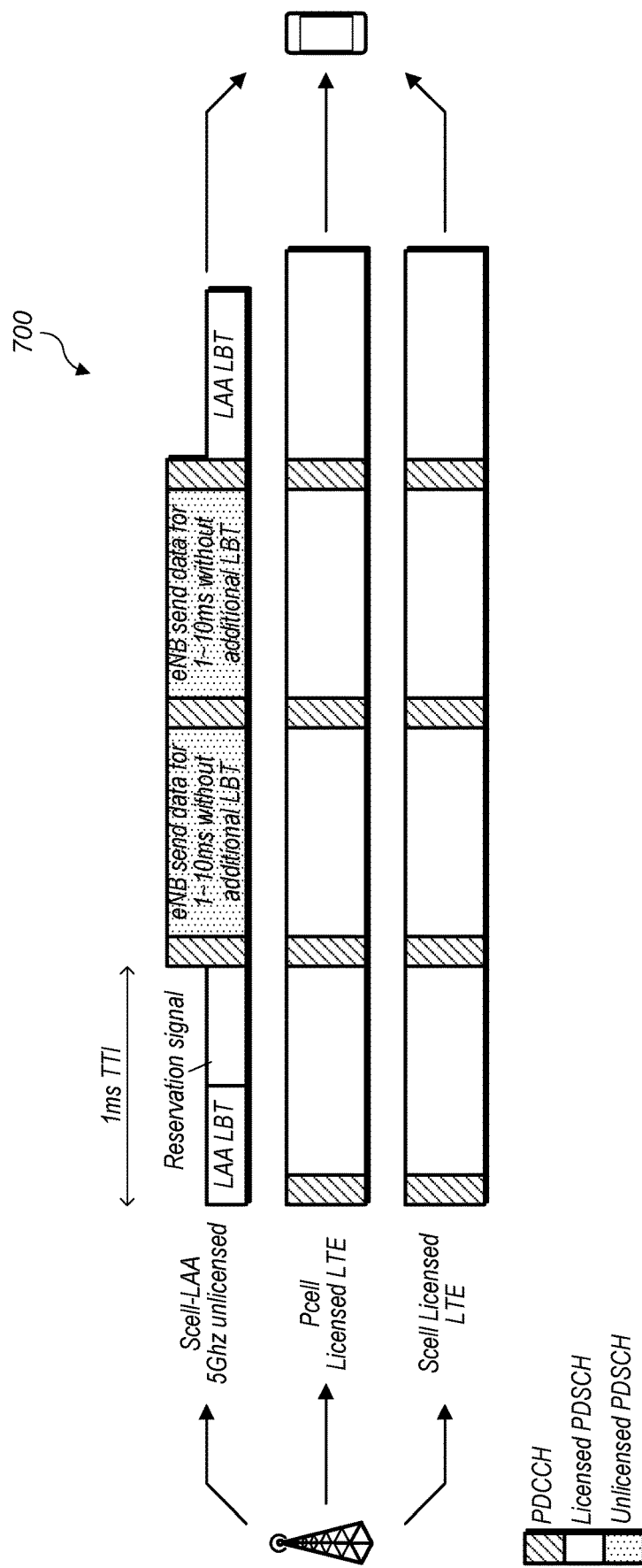
FIGS. 7-8 illustrate exemplary aspects of LAA communication, according to some embodiments.
Figure 8:
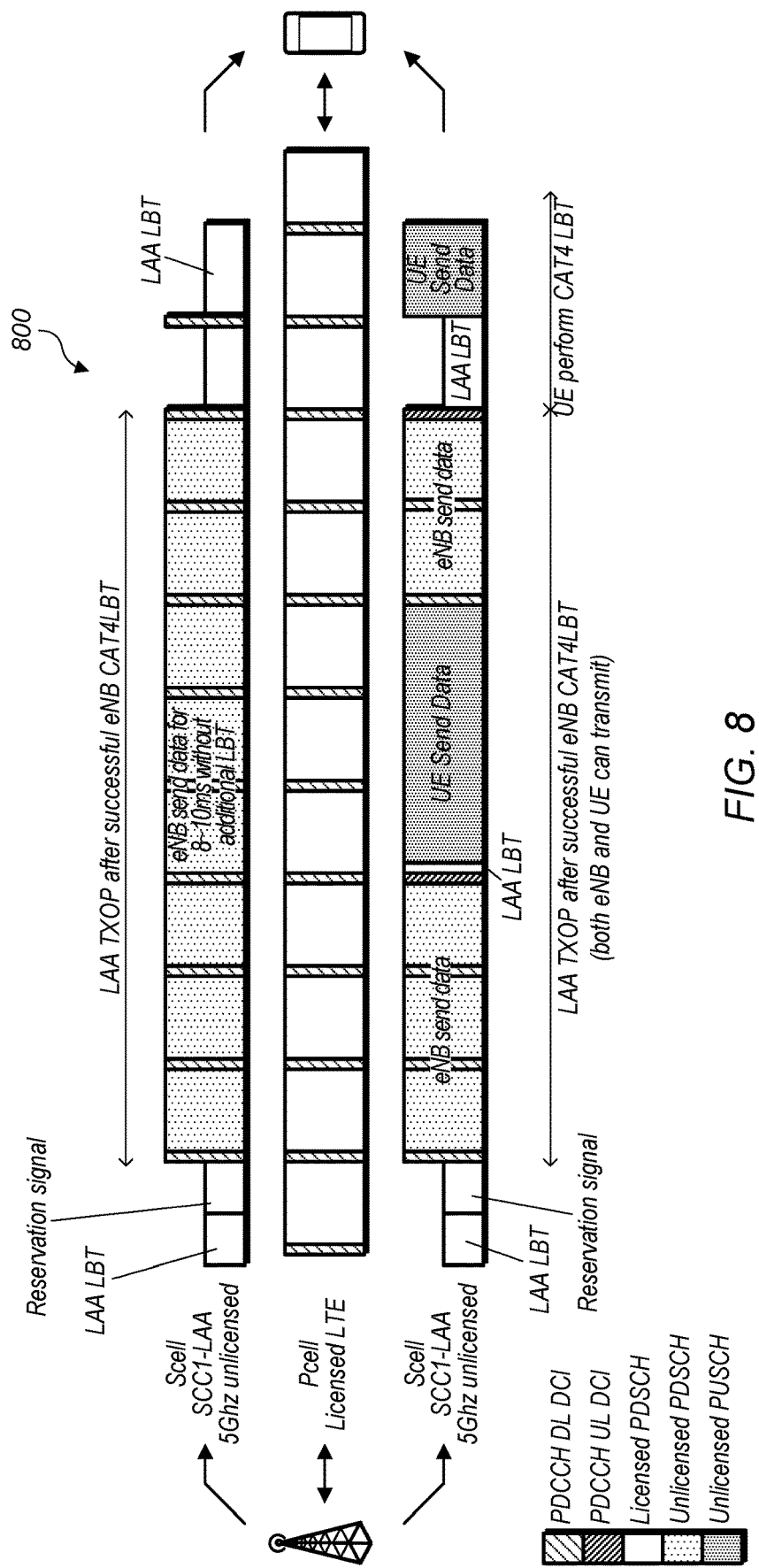

FIGS. 7-8—LAA Structure Summary

In LTE, carrier aggregation (CA) may refer to two or more component carriers (CCs) being aggregated in order to support wider transmission bandwidths, e.g., bandwidths of up to 100 MHz. A UE may simultaneously receive or transmit on one or multiple CCs depending on the UE's capabilities. When CA is configured, the UE may maintain one RRC connection with the network. The serving cell managing the UE's RRC connection is referred to as the Primary Cell (Pcell), and Secondary Cells (Scells) together with the PCell may form a set of serving cells. In CA, a UE may be scheduled via the physical downlink control channel (PDCCH) over multiple serving cells simultaneously. Cross-carrier scheduling, e.g., using a Carrier Indicator Field (CIF), may allow the PDCCH of a serving cell to schedule resources on another serving cell. That is, a UE receiving a downlink assignment on one CC may receive associated data on another CC.

LAA may include a sub-category of LTE inter-band carrier aggregation, in which one of the secondary carriers is operating in a 5 GHz unlicensed band, a band over which communications according to another RAT, such as Wi-Fi, may also be taking place. Resources in an LAA carrier may be scheduled in the same manner that resources are scheduled in legacy CA. That is, same carrier scheduling and/or cross-carrier scheduling may be used for scheduling LAA carriers, e.g., using the PDCCH or ePDCCH. An LAA Scell may operate in a frame structure 3 composed of 20 slots and may be accessed following a successful listen-before-talk (LBT) procedure, as one possibility.

Note that (e.g., depending on the applicable standard version and/or implementation choices), LAA may be used for downlink communication and/or uplink communication. For example, according to some embodiments, LAA release 13 may include standard specification details for using a SCell for downlink transmissions, while LAA release 14 may include standard specification details for using a SCell for both downlink and uplink transmissions.

FIG. 7 shows an example of possible LAA control and data scheduling in an example Release 13 scenario 700. As shown, an eNB may communicate with a wireless device using three CCs in the example scenario of FIG. 7. The CCs may include a Pcell and one Scell that operate in licensed LTE spectrum, as well as one LAA Scell that operates in unlicensed 5 GHz spectrum. The eNB may make use of an LBT procedure and (e.g., if needed) a reservation signal prior to performing 1-10 ms of communication on the LAA Scell. A further LBT procedure may again be performed prior to performing additional downlink communication on the LAA Scell.

FIG. 8 shows an example of possible LAA control and data scheduling in an example Release 14 scenario 800. As shown, an eNB may also communicate with a wireless device using three CCs in the example scenario of FIG. 8. The CCs may in this example include a Pcell that operates in licensed LTE spectrum and two Scells that operate in unlicensed 5 GHz spectrum. The eNB may make use of an LBT procedure and (e.g., if needed) a reservation signal prior to performing 1-10 ms of communication on each of the LAA Scells. The eNB may be able to provide some portion of the LAA Scell resources for uplink transmit opportunities. For example, as shown, the eNB may provide an indication of an uplink transmit opportunity (TXOP) to the wireless device during its reserved LAA TXOP via downlink control information (DCI) sent on the PDCCH, based on which the wireless device may perform its own LBT procedure and send uplink data on the LAA Scell.

FIGS. 9-21—Communication Flow Diagrams

Providing coexistence features for cellular communication in unlicensed spectrum may be useful to improve quality of service obtained by wireless devices performing cellular, Wi-Fi, and/or other forms of communication in unlicensed spectrum, and/or may help improve cell capacity for carriers utilizing unlicensed spectrum. The coexistence features described herein may include or be based at least in part on awareness within a wireless device of various applications' communication activity according to various wireless communication technologies that operate in the same frequency band (e.g., utilize the same wireless medium or at least partially overlapping wireless media). Such awareness may in turn allow the wireless device and/or the devices with which it is communicating to (e.g., dynamically/temporarily) modify their communication configuration to better accomodate other communication activities of the wireless device and/or of the communication system in which the wireless device is participating.

Accordingly, FIGS. 9-21 illustrate aspects of various possible coexistence features for cellular communication in unlicensed spectrum that may be used in conjunction with the various aspects of this disclosure, and/or that may be used in any number of other contexts, as desired.

Aspects of the methods of FIGS. 9-21 may be implemented by a wireless device and a cellular base station, such as a UE 106 and a BS 102 illustrated in and described with respect to various of the Figures herein, or more generally in conjunction with any of the computer systems or devices shown in the above Figures, among other devices, as desired. Note that while at least some elements of the methods of FIGS. 9-21 are described in a manner relating to the use of communication techniques and/or features associated with LTE, LTE-A, and/or 3GPP specification documents, such description is not intended to be limiting to the disclosure, and aspects of the methods of FIGS. 9-21 may be used in any suitable wireless communication system, as desired. In various embodiments, some of the elements of the methods shown may be performed concurrently, in a different order than shown, may be substituted for by other method elements, or may be omitted. Additional method elements may also be performed as desired.

As shown, the method of FIG. 9 may operate as follows. In 902, the UE and the BS may communicate using an original communication configuration. The UE may be capable of performing cellular communication with the BS in both licensed and unlicensed frequency bands. At least according to some embodiments, the original communication configuration may support communication in at least one licensed frequency band and at least one unlicensed frequency band. For example, the original communication configuration may include a carrier aggregation scheme in which an LTE carrier (e.g., deployed in a licensed frequency band) is used as a primary component carrier and a LAA carrier (e.g., deployed in an unlicensed frequency band, such as the 5 GHz ISM band) is used as a secondary component carrier. According to the communication configuration, the BS may schedule data communications between the UE and the BS as the BS deems appropriate, e.g., in view of load, channel conditions, uplink and/or downlink buffer status of the wireless device and/or other devices served by the BS, and/or any of various other possible considerations.

In 904, the UE may determine that a long duration communication activity is occurring at the wireless device, based on which it may be desirable to modify the communication configuration between the UE and the BS. The communication activity may include any of various possible communication activities that might impact or be impacted by cellular communication on the unlicensed frequency band. As one possibility, the communication activity may include a Wi-Fi communication activity by the wireless device on the unlicensed frequency band, which might impact the ability of the wireless device (e.g., cause the wireless device to not be able) to receive cellular communications on the unlicensed frequency band. As another possibility, the communication activity may include a high priority cellular communication activity, which may be particularly sensitive to channel conditions, congestion, or other possible considerations with respect to the unlicensed frequency band, such that it may be desirable to preferentially communicate data for the high priority cellular communication activity on a licensed frequency band and/or not to communicate data for the high priority cellular communication activity on the unlicensed frequency band (e.g., if the unlicensed frequency band has poor channel conditions or is congested). As a still further possibility, the communication activity may include a low priority cellular communication activity, which may have few or no latency or timing considerations, such that it may be acceptable to communicate data for the low priority cellular communication activity on a less reliable (and potentially less expensive) carrier, such as on the unlicensed frequency band. In this case, it may be preferable to not communicate data for the low priority cellular communication activity on the licensed frequency band and/or to communicate data for the low priority cellular communication activity on the unlicensed frequency band (e.g., to free up the licensed bandwidth for higher priority communication activities and/or to reduce expense to the user).

Note that determination that a communication activity has a long duration may be performed in any desired manner. As one possibility, an expected length of the communication activity may be determined (e.g., based on an application type associated with the communication activity, user input, historical usage patterns at the wireless device and/or for similar wireless devices, or in any other desired manner), and if the expected length is above a certain threshold, the communication activity may be considered long duration. As another possibility, certain types of communication activities may be considered as having a long duration without any explicit calculation of expected length or comparison to a length threshold. As another possibility, the actual amount of time for which the communication activity has been occurring may be determined, and once that amount of time is greater than a certain threshold, it may be determined that the communication activity is a long duration communication activity. Other techniques for determining whether a communication activity has a long duration are also possible.

In 906, the UE may provide an indication to the BS to modify the communication configuration between the UE and the BS with respect to operation in the unlicensed frequency band. The indication may be provided based at least in part on determining that the long duration communication activity is occurring at the wireless device. The type of indication used and the modification indicated may include any of a variety of possibilities, e.g., depending on the type of long duration communication activity that is occurring, the signaling framework in place for such indications and modifications between the UE and the BS, and/or any of various other considerations.

For example, in some embodiments, the UE and the BS may have a signaling framework in place for indicating co-existence related considerations and potential communication configuration modifications for operation in unlicensed frequency bands. Such a framework could, for example, support indications to temporarily deactivate or reactivate a carrier deployed on an unlicensed frequency band, to prioritize data communication (or a portion thereof, such as a portion associated with a particular application type or service type) to occur on a licensed carrier (e.g., and not to occur on an unlicensed carrier, or only to occur on an unlicensed carrier if certain conditions indicative of capability of the unlicensed carrier to support a minimum QoS standard are met), and/or to prioritize data communication (or a portion thereof) to occur on an unlicensed carrier (e.g., and not on a licensed carrier). In this case, such a framework may be used by the UE for the indication and suggested modification. Alternatively, other signaling framework elements, possibly including signaling framework elements that are not specifically designed to indicate co-existence related considerations and potential communication configuration modifications for operation in unlicensed frequency bands, may be leveraged by the UE to improve coexistence characteristics of the device's operation in unlicensed spectrum.

As one possibility, in a scenario in which the communication activity includes Wi-Fi communication on an unlicensed frequency band, the indication to modify the communication configuration with respect to operation in an unlicensed frequency band may be an indication to deactivate a carrier between the wireless device and the cellular base station that is deployed on the unlicensed frequency band. This may prevent the BS from scheduling the UE on such a carrier during times when the UE might not be capable of successfully receiving and decoding data transmitted on the carrier, e.g., due to the Wi-Fi communication. As previously noted, the indication may be an explicit indication/request to deactivate the carrier if a signaling framework for such an indication is in place between the UE and the BS. As another possibility, a tracking area update (TAU) with a capability update indicator set to true, followed by an update of the UE's capability information to indicate that the UE is not capable of communicating using the unlicensed frequency band, may be used to effectively deactivate any carrier between the wireless device and the cellular base station that is deployed on the unlicensed frequency band, even if a signaling framework for temporarily deactivating and reactivating a carrier on an unlicensed frequency band is not in place. Note that as a still further possibility, the UE may be able to cause the BS to deactivate a carrier that is deployed on the unlicensed frequency band by refraining from sending measurements indicative of channel quality to the BS for that carrier.

As another possibility, in a scenario in which the communication activity includes a high priority cellular communication, the indication to modify the communication configuration with respect to operation in an unlicensed frequency band may include an indication to preferably perform the high priority cellular communication on a carrier between the wireless device and the cellular base station that is deployed on a licensed frequency band, e.g., over a carrier between the wireless device and the cellular base station that is deployed on the unlicensed frequency band. Additionally or alternatively, the UE may provide an indication to set up a high priority/high QoS bearer (e.g., in addition to a default/normal bearer) for the high priority cellular communication, which may be limited to licensed carriers or preferably communicated using licensed carriers, according to some embodiments. In some embodiments, the BS may utilize deep packet inspection (DPI) to distinguish data for the high priority cellular communication from other data for the UE. Other techniques may also or alternatively be used, if desired.

Note that in some embodiments, the UE may also evaluate wireless medium conditions for the unlicensed frequency band (or for a carrier deployed in the unlicensed frequency band) when determining a type of indication and/or requested modification to the communication configuration to provide. For example, in some embodiments, if the unlicensed frequency band is expected to provide sufficient QoS (e.g., based on any of various metrics, such as cell/carrier strength measurements, downlink packet latency, uplink channel conditions, etc.), the UE may not request any restrictions or preference regarding whether the high priority cellular communication is performed on a licensed or unlicensed carrier. In such embodiments, if the unlicensed frequency band is not expected to provide sufficient QoS, the UE may request a restriction or indicate a preference such that the high priority cellular communication is preferably performed on a licensed carrier.

According to some embodiments, if a high priority cellular communication is occurring and is using a carrier that is deployed on an unlicensed frequency band (e.g., that can also used by the UE for Wi-Fi), the UE may also or alternatively choose not to perform Wi-Fi communication on the unlicensed frequency band while the high priority cellular communication activity is occurring using the carrier between the wireless device and a cellular base station that is deployed on the unlicensed frequency band. This may help prevent internally generated interference/receiver desensing from such Wi-Fi communication that might negatively affect the high priority cellular communication.

As still another possibility, in a scenario in which the communication activity includes a low priority cellular communication, the indication to modify the communication configuration with respect to operation in an unlicensed frequency band may include an indication to preferably perform the low priority cellular communication on a carrier between the wireless device and the cellular base station that is deployed on an unlicensed frequency band, e.g., over a carrier between the wireless device and the cellular base station that is deployed on a licensed frequency band. Additionally or alternatively, the UE may provide an indication to set up a low priority/low QoS bearer (e.g., in addition to a default/normal bearer) for the low priority cellular communication, which may be limited to unlicensed carriers or preferably communicated using unlicensed carriers, according to some embodiments. In some embodiments, the BS may utilize DPI to distinguish data for the low priority cellular communication from other data for the UE. Other techniques may also or alternatively be used, if desired.

In 908, the UE and the BS may communicate using a modified communication configuration, e.g., based on the indication to modify the communication configuration provided by the UE. For example, if the UE provided an indication to deactivate an unlicensed carrier, the modified communication configuration may include not communicating using the unlicensed carrier. If the UE provided an indication to preferably perform high priority cellular communication on a licensed carrier, the modified communication configuration may preferably perform the high priority cellular communication on a licensed carrier (e.g., by communicating the high priority cellular data on a high priority bearer, and/or using DPI or another identification technique to filter the high priority cellular data from other data). If the UE provided an indication to preferably perform low priority cellular communication on an unlicensed carrier, the modified communication configuration may preferably perform the low priority cellular communication on an unlicensed carrier (e.g., by communicating the low priority cellular data on a low priority bearer, and/or using DPI or another identification technique to filter the low priority cellular data from other data).

At some point, the long duration communication activity may be complete. At this point, the UE may provide an indication to the BS that modifying the communication configuration with respect to operation in the unlicensed frequency band is no longer needed (e.g., based at least in part on determining that the communication activity is complete), or may otherwise provide an indication to the BS to further modify the communication configuration with respect to operation in the unlicensed frequency band in view of the completion of the long duration communication activity. For example, if the long duration communication activity included Wi-Fi communication on the unlicensed frequency band, the UE may provide an indication to reactivate a carrier between the UE and the BS that is deployed on the unlicensed frequency band, or alternatively may provide an indication that deactivating such a carrier is no longer requested. As another example, if the long duration communication activity included high priority cellular communication, the UE may provide an indication that preferably performing high priority cellular communication on a licensed carrier is no longer requested. Note that the UE might also or alternatively provide such an indication, at least according to some embodiments, if wireless medium conditions for the unlicensed frequency band improve, e.g., such that the UE determines that the unlicensed frequency band is expected to provide sufficient QoS for the high priority cellular communication, potentially even if the long duration communication activity is still ongoing. As yet another example, if the long duration communication activity included low priority cellular communication, the UE may provide an indication that preferably performing low priority cellular communication on an unlicensed carrier is no longer requested. Other types of indications and communication configuration modifications (or removal of communication configuration modifications) are also possible.

Figure 9:
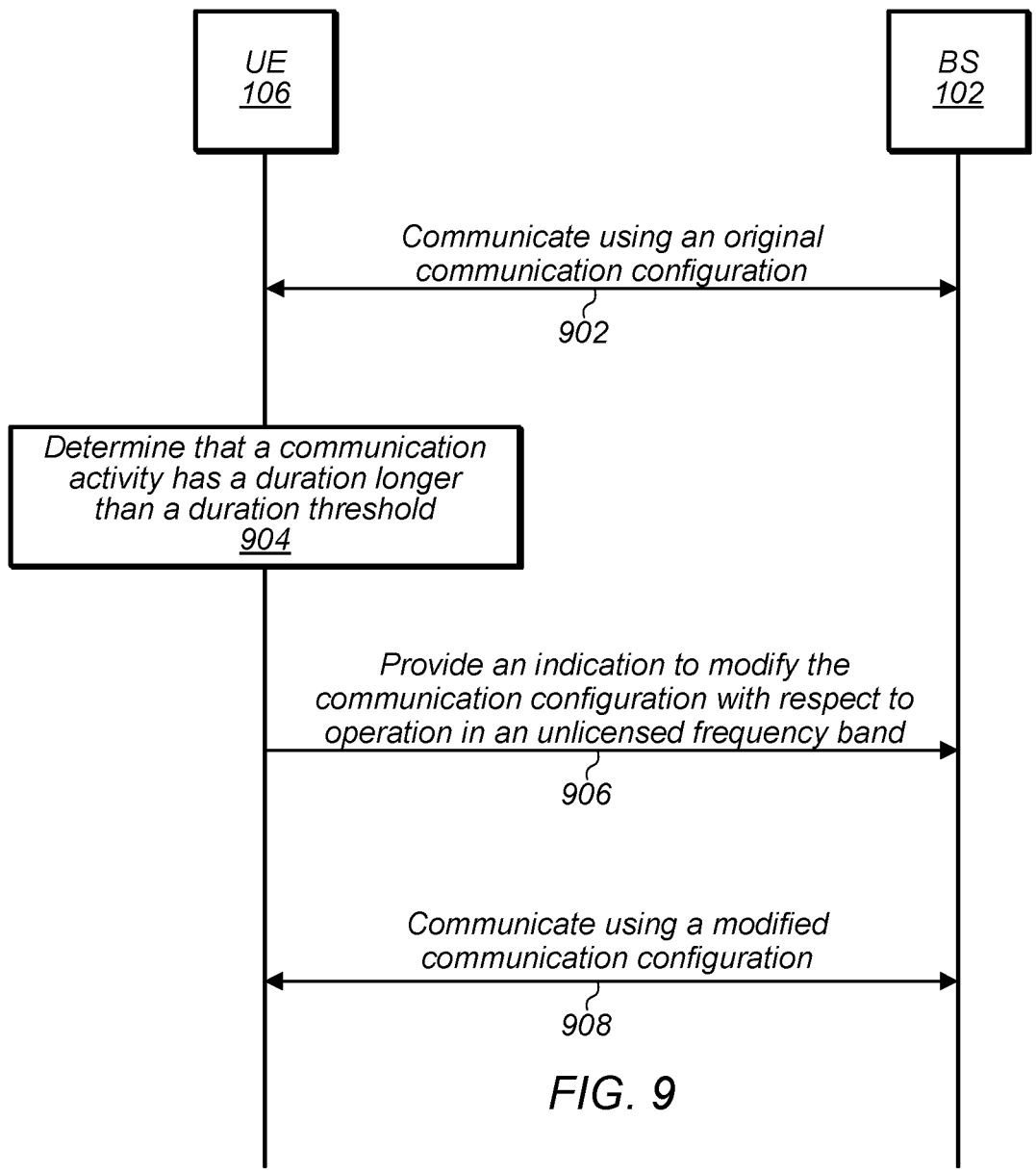
FIGS. 9-21 are communication flow diagrams illustrating aspects of exemplary possible coexistence features for cellular communication in unlicensed spectrum, according to some embodiments.

FIGS. 10-21 and the following information are provided as being illustrative of further considerations and possible implementation details relating to the method of FIG. 9, and are not intended to be limiting to the disclosure as a whole. In particular, FIGS. 10-21 may be illustrative of various possible coexistence features that could be implemented in 3GPP based communication systems in which LAA can be used to provide one or more cellular carriers on an unlicensed frequency band such as the 5 GHz ISM band. Numerous variations and alternatives to the details provided herein below are possible and should be considered within the scope of the disclosure.

When LAA is active (e.g., the B46 band is deployed in the unlicensed 5 GHz band), it may cause co-existence related issues for a wireless device when 5 Ghz activity occurs. Some possible mitigations may be used (e.g., temporarily disabling LAA by dropping CA with B46 using virtual radio link failure (vRLF)) when Wi-Fi interruption are small.

This disclosure includes proposals to address scenarios when Wi-Fi over 5 Ghz may be enabled for long durations and/or there is a long duration high priority traffic over cellular expected for some time. This may reduce impact to data throughput due to coexistence issues and thereby improve potential benefits of LAA to users. This disclosure may also improve cell capacity for carriers while providing an adequate level of service for users utilizing LAA, according to some embodiments. In some instances, a dedicated signaling framework may be used, while in some instances, it may also or alternatively be possible to use different mechanisms (e.g., in networks that do not support dedicated features for facilitating coexistence in unlicensed frequency bands) to still achieve improved coexistence characteristics.

Numerous possible communication activities could potentially benefit from some or all of the coexistence related features described herein. Some examples of long duration Wi-Fi activity that could interfere with LAA could include Wi-Fi communication with a set-top box while streaming movies over cellular, or Wi-Fi peer-to-peer sessions for direct data communication between devices, among various possibilities. An example of a long duration high priority cellular activity that could benefit from careful link selection could include video calls/chats over cellular. An example of a long duration low priority cellular activity that could benefit from careful link selection could include data backup to cloud storage over cellular. Other communication activities that could potentially benefit from some or all of the coexistence related features described herein are also possible.

Figure 10:
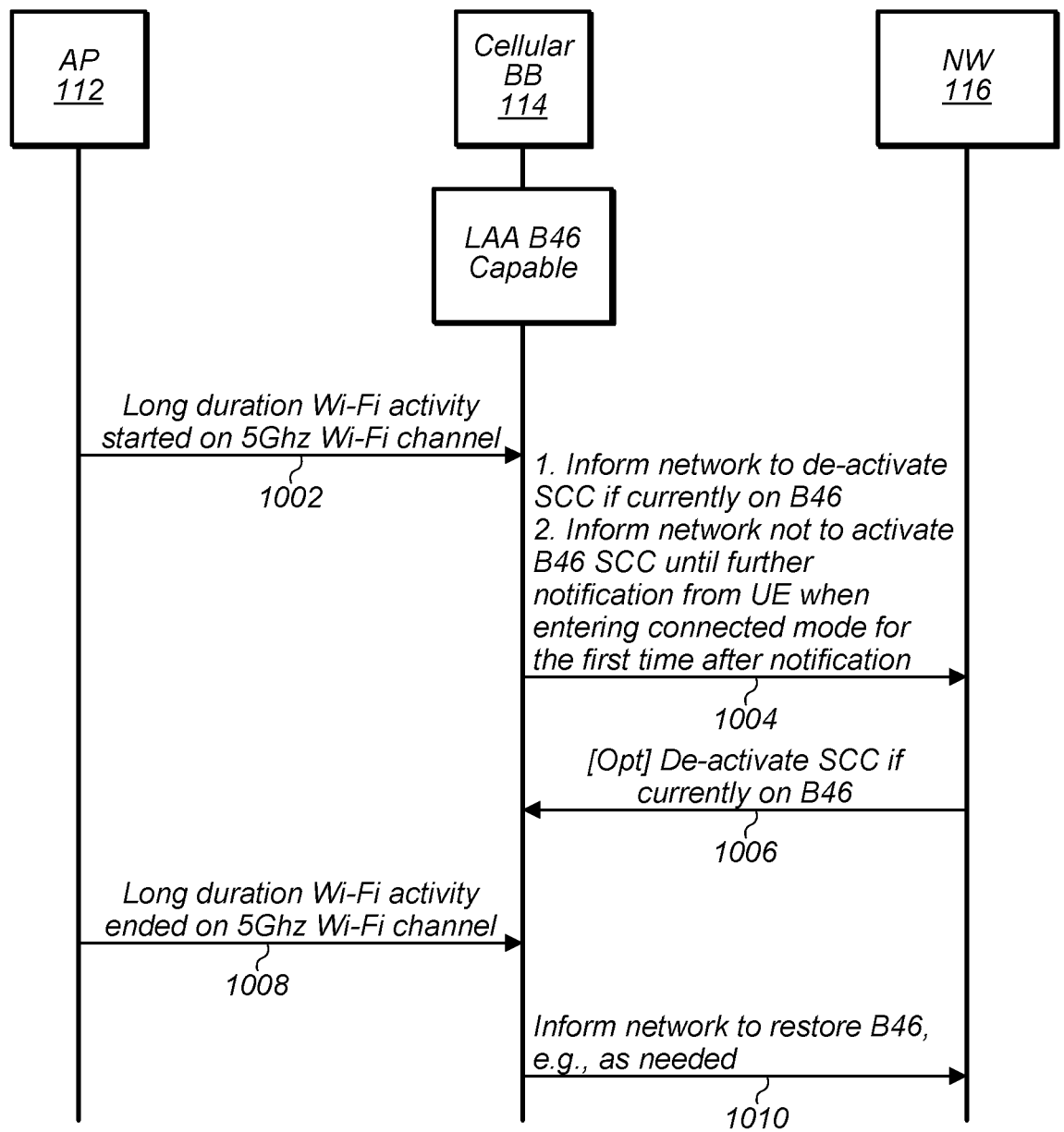

FIG. 10 illustrates aspects of a scenario in which a long duration Wi-Fi activity is occurring, and in which a communication framework is provided for indicating coexistence considerations relating to use of unlicensed spectrum to the network. As shown, a wireless device may include a cellular baseband (BB) 114 portion, which may be LAA B46 capable. In 1002, the BB 114 may be informed by an application processor (AP) 112 portion of the wireless device that a long duration Wi-Fi activity has started on a 5 GHz Wi-Fi channel. In 1004, the BB 114 may inform a cellular network (NW) 116 (e.g., by way of a cellular base station providing radio access to the NW 116) to deactivate any secondary component carrier (SCC) currently active on B46, and/or not to activate a B46 SCC until further notification from the wireless device when entering connected mode for the first time after the notification. In 1006, the NW may deactivate any SCC currently active on B46. In 1008, the AP 112 may inform the BB 114 when the long duration Wi-Fi activity on the 5 GHz Wi-Fi channel has ended. In 1010, the BB 114 may inform the NW 116 that it can restore (e.g., reactivate) a B46 carrier, e.g., as needed.

Figure 11:
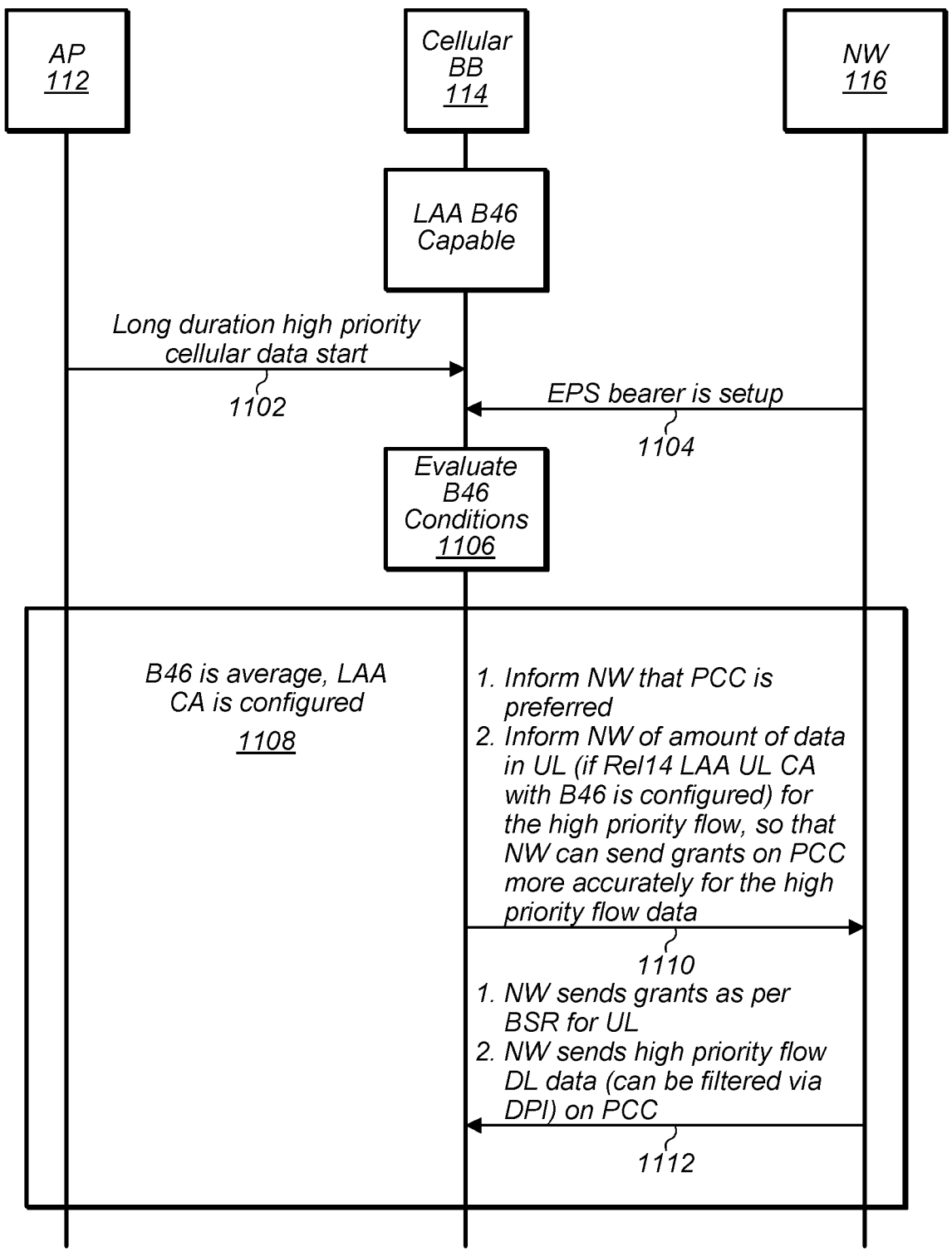
Figure 12:
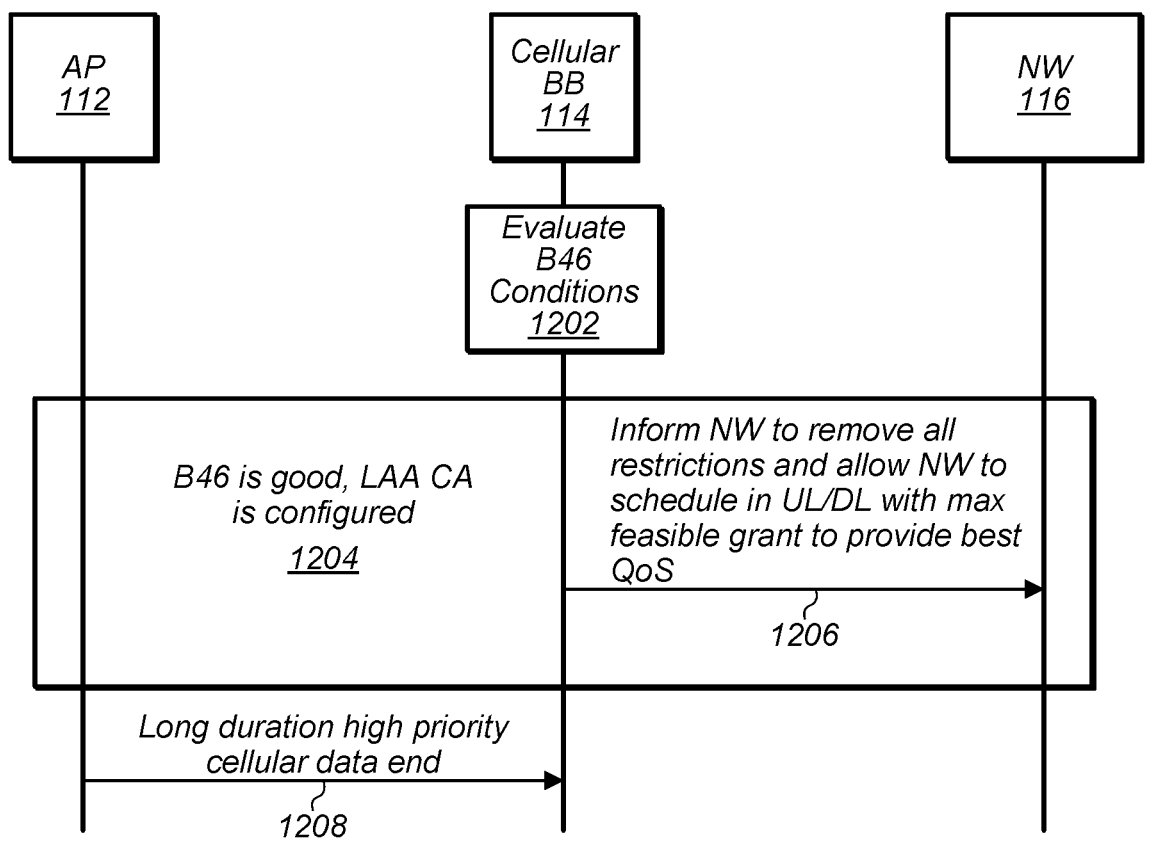

FIGS. 11-12 illustrate aspects of a scenario in which a long duration high priority cellular activity is occurring, and in which a communication framework is provided for indicating to the network coexistence considerations relating to use of unlicensed spectrum. As shown, cellular BB 114 may be LAA B46 capable. In 1102, AP 112 may indicate to BB 114 that a long duration high priority cellular data communication has started. In 1104, the NW 116 may inform BB 114 that an evolved packet service (EPS) bearer is setup. In 1106, BB 114 may evaluate B46 conditions. Any number of criteria, potentially including but not limited to A3/A6 criteria, downlink packet transfer latency, uplink channel conditions (e.g., if LBT implementation is available at the device), etc., may be used when evaluating B46 conditions. In 1108, it may be determined that B46 conditions are 'average' (e.g., a state worse than a 'good' state). In 1110, BB 114 may accordingly inform the NW 116 that the primary component carrier (PCC) is preferred. BB 114 may also inform the NW 116 of the amount of data in uplink (e.g., if Rel. 14 LAA UL CA with B46 is configured) for the high priority flow, so that the NW 116 can send UL grants to the BB 114 more accurately for the high priority data flow. In 1112, the NW 116 may send grants as per the buffer status report (BSR) provided by BB 114 for UL communication. The NW 116 may also send high priority DL data (which can be filtered via DPI or in any other desired manner) on the PCC.

As shown in FIG. 12, in 1202, the BB 114 may (e.g., at a different time) evaluate B46 conditions. In this case, in 1204, it may be determined that B46 conditions are 'good' (e.g., a state better than the 'average' state). In 1206, the BB 114 may accordingly inform the NW 116 to remove all restrictions and allow the NW 116 to schedule in UL/DL at its discretion, e.g., to provide the maximum feasible grant(s) to provide good QoS. In 1208, the AP 112 may indicate to the BB 114 that the long duration high priority cellular data communication has ended.

Figure 13:
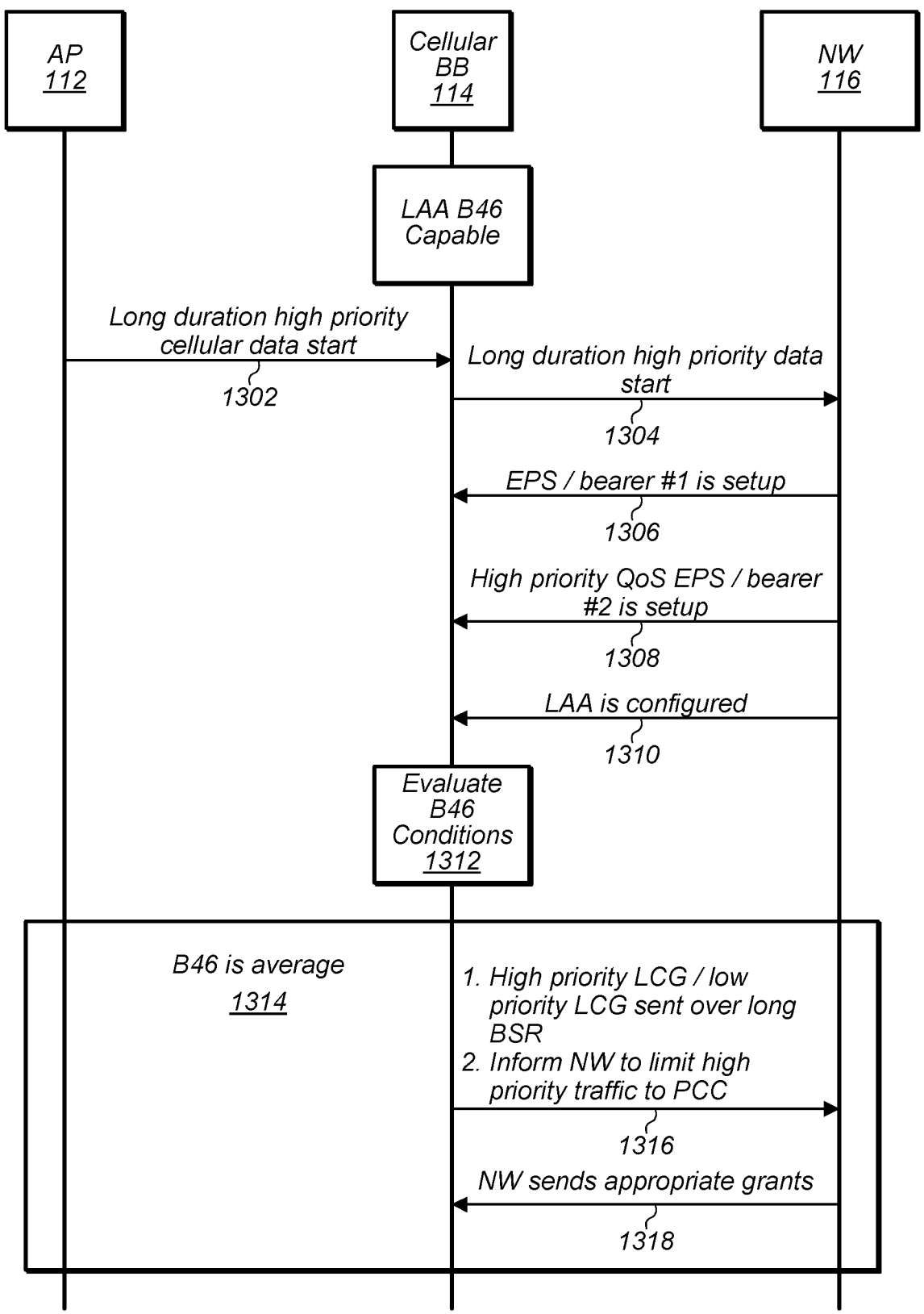
Figure 14:
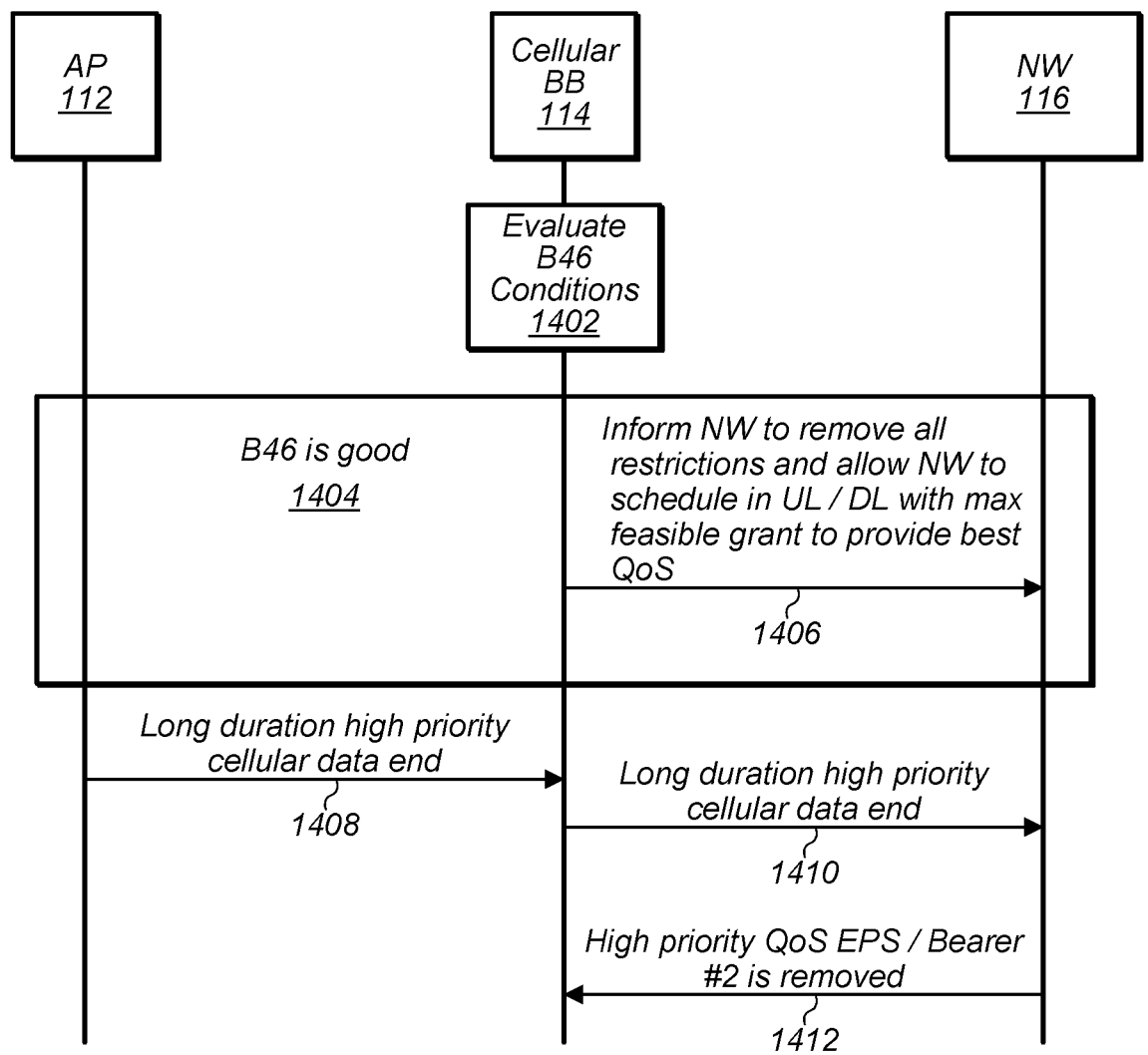

FIGS. 13-14 illustrate aspects of an alternate approach in a scenario in which a long duration high priority cellular activity is occurring, and in which a communication framework is provided for indicating to the network coexistence considerations relating to use of unlicensed spectrum. As shown, cellular BB 114 may be LAA B46 capable. In 1302, AP 112 may indicate to BB 114 that a long duration high priority cellular data communication has started. In 1304, the BB 114 may indicate to the NW 116 that a long duration high priority cellular data communication has started. In 1306, the NW 116 may inform BB 114 that a first EPS bearer is setup. In 1308, the NW 116 may inform BB 114 that a second (e.g., high priority/high QoS) EPS bearer is setup. In 1310, the NW may inform BB 114 that LAA is configured. In 1312, BB 114 may evaluate B46 conditions. In 1314, it may be determined that B46 conditions are 'average'. In 1316, BB 114 may accordingly provide high priority logical channel group (LCG) and low priority LCG BSR information to the NW 116, e.g., using a long BSR format. The BB 114 may further inform the NW 116 to limit high priority traffic to communication on the PCC. In 1318, the NW 116 may send grants as per the BSR(s) provided by BB 114 and/or as needed to service DL data. The NW may schedule data for the high priority EPS bearer on the PCC and also provide UL grants based on the BSR of the logical channel mapped to the high priority EPS bearer, e.g., allowing the UE to transmit high priority EPS bearer data on the PCC. The network may dynamically adapt the mapping of high priority EPS bearer to PCC or unlicensed SCC based on the channel conditions of available licensed and unlicensed frequencies.

As shown in FIG. 14, in 1402, the BB 114 may (e.g., at a different time) evaluate B46 conditions. In this case, in 1404, it may be determined that B46 conditions are 'good'. In 1406, the BB 114 may accordingly inform the NW 116 to remove all restrictions and allow the NW 116 to schedule in UL/DL at its discretion, e.g., to provide the maximum feasible grant(s) to provide good QoS. In 1408, the AP 112 may indicate to the BB 114 that the long duration high priority cellular data communication has ended. In 1410, the BB 114 may indicate to the NW 116 that the long duration high priority cellular data communication has ended. In 1412, the NW 116 may indicate to the BB 114 that the second (e.g., high priority/high QoS) EPS bearer is removed.

Figure 15:
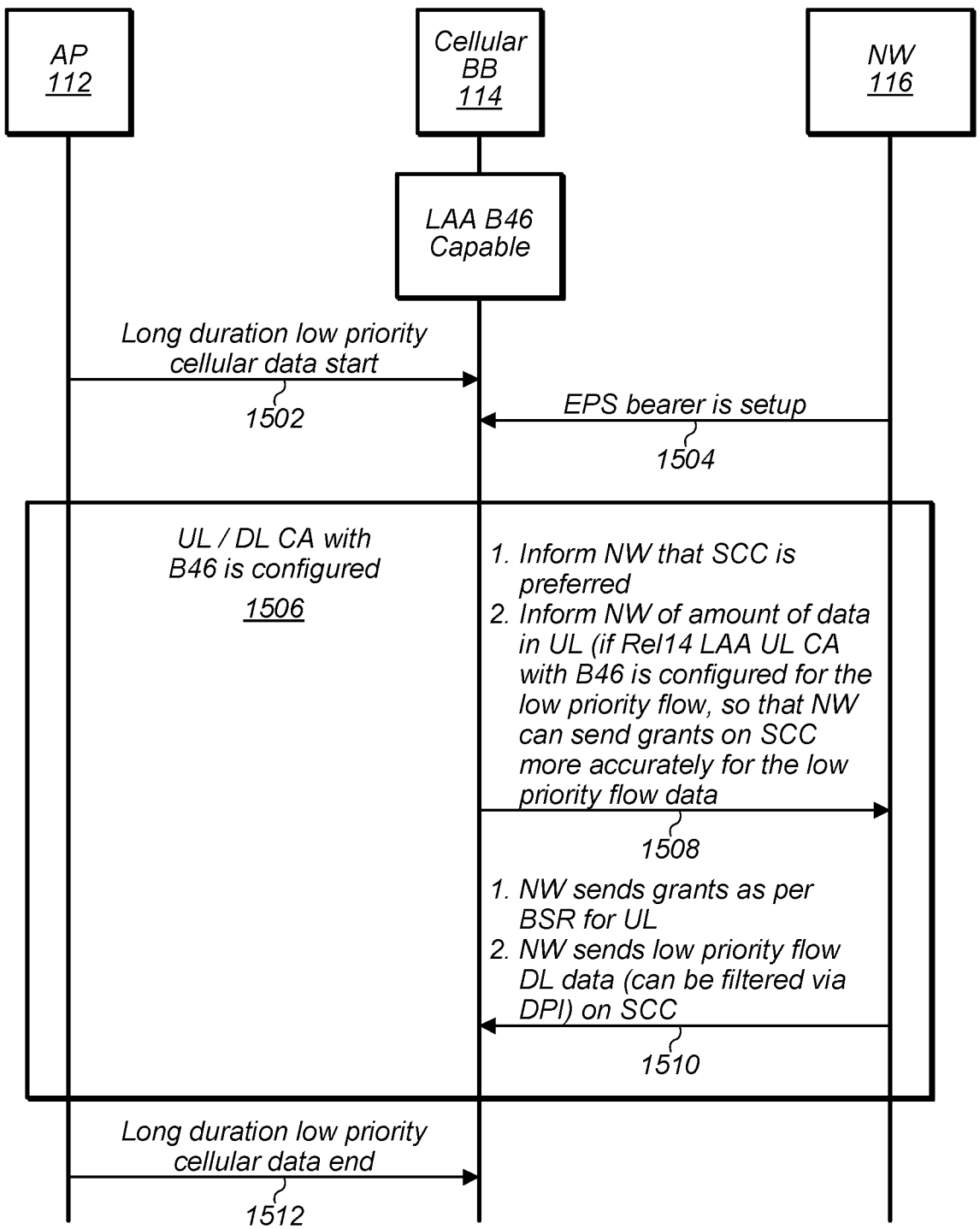

FIG. 15 illustrates aspects of a scenario in which a long duration low priority cellular activity is occurring, and in which a communication framework is provided for indicating to the network coexistence considerations relating to use of unlicensed spectrum. As shown, cellular BB 114 may be LAA B46 capable. In 1502, AP 112 may indicate to BB 114 that a long duration low priority cellular data communication has started. In 1504, the NW 116 may inform BB 114 that an evolved packet service (EPS) bearer is setup. In 1506, it may be determined that UL/DL CA with B46 is configured. In 1508, BB 114 may accordingly inform the NW 116 that the SCC is preferred. BB 114 may also inform the NW 116 of the amount of data in uplink (e.g., if Rel. 14 LAA UL CA with B46 is configured) for the low priority flow, so that the NW 116 can send UL grants to the BB 114 more accurately for the low priority data flow. In 1510, the NW 116 may send grants as per the BSR provided by BB 114 for UL communication. The NW 116 may also send low priority DL data (which can be filtered via DPI or in any other desired manner) on the SCC. In 1512, the AP 112 may indicate to the BB 114 that the long duration low priority cellular data communication has ended.

Figure 16:
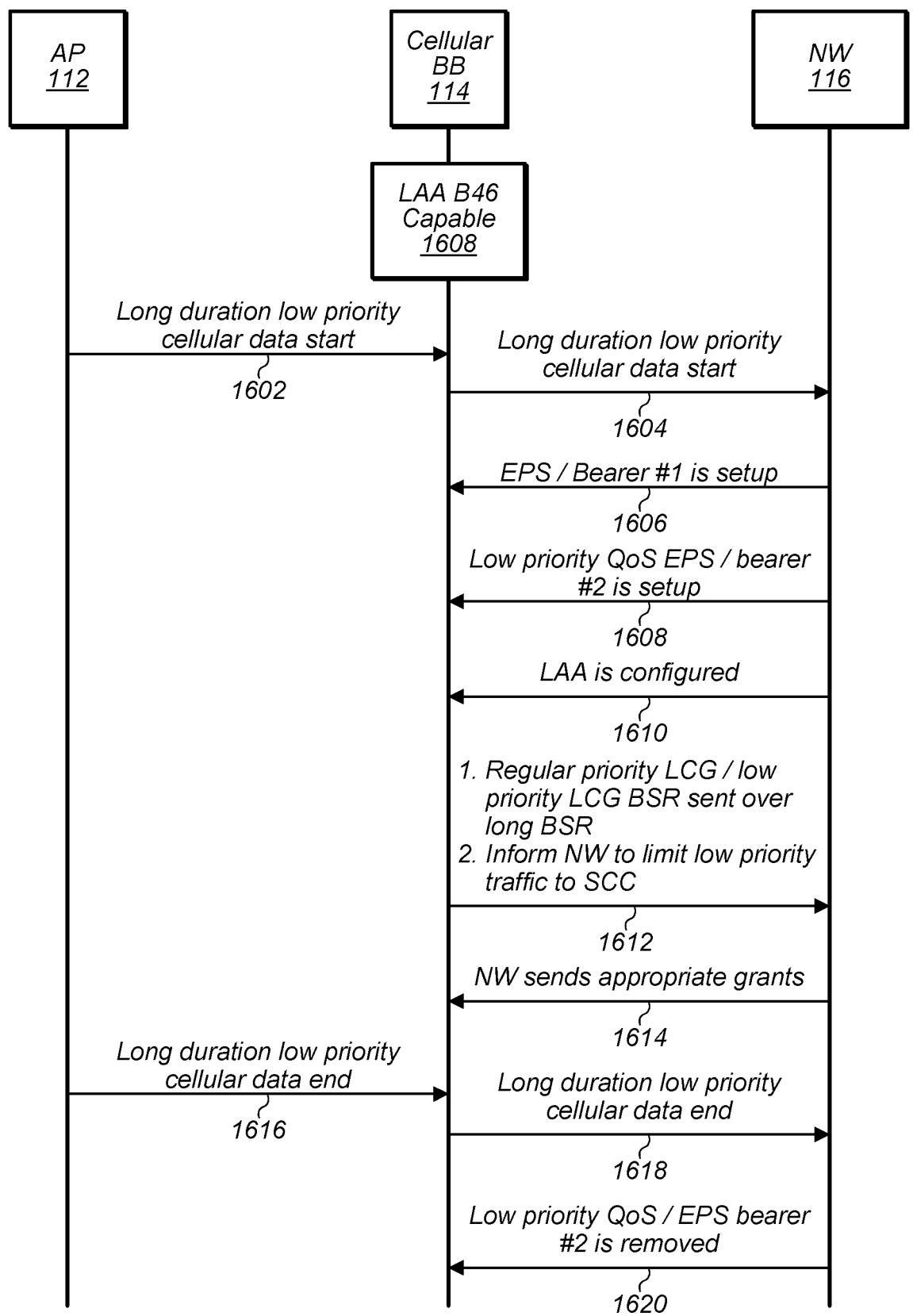

FIG. 16 illustrates aspects of an alternate approach in a scenario in which a long duration low priority cellular activity is occurring, and in which a communication framework is provided for indicating to the network coexistence considerations relating to use of unlicensed spectrum. As shown, cellular BB 114 may be LAA B46 capable. In 1602, AP 112 may indicate to BB 114 that a long duration low priority cellular data communication has started. In 1604, the BB 114 may indicate to the NW 116 that a long duration low priority cellular data communication has started. In 1606, the NW 116 may inform BB 114 that a first EPS bearer is setup. In 1608, the NW 116 may inform BB 114 that a second (e.g., low priority/low QoS) EPS bearer is setup. In 1610, the NW may inform BB 114 that LAA is configured. In 1612, BB 114 may accordingly provide regular priority LCG and low priority LCG BSR information to the NW 116, e.g., using a long BSR format. The BB 114 may further inform the NW 116 to limit low priority traffic to communication on the SCC. In 1614, the NW 116 may send grants as per the BSR(s) provided by BB 114 and/or as needed to service DL data. In 1616, the AP 112 may indicate to the BB 114 that the long duration low priority cellular data communication has ended. In 1618, the BB 114 may indicate to the NW 116 that the long duration low priority cellular data communication has ended. In 1620, the NW 116 may indicate to the BB 114 that the second (e.g., low priority/low QoS) EPS bearer is removed.

According to some embodiments, a framework that supports such communication flows as illustrated in FIGS. 15-16 may facilitate transfer of "low priority/background" data with lower reliability over a (e.g., potentially) more error/delay prone LAA B46 SCC. This may allow a network operator to free up their bandwidth over the licensed PCC and thus effectively expand their capacity. In such instances, it could be the case that such a network operator would be able to provide the user with lower pricing (e.g., due to an agreement to use less reliable cellular service for such low priority background data communication). Other arrangements are also possible.

Figure 17:
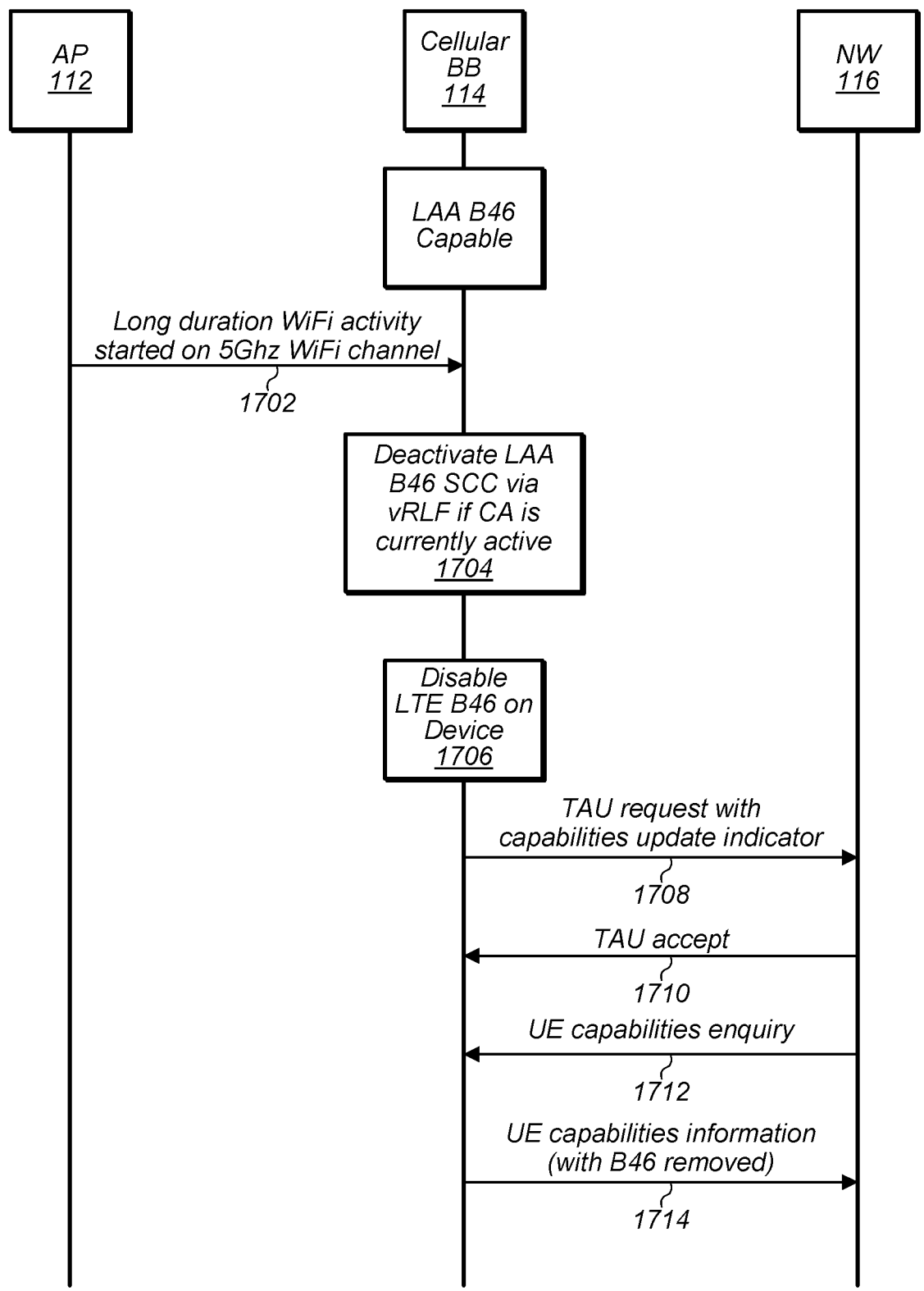
Figure 18:
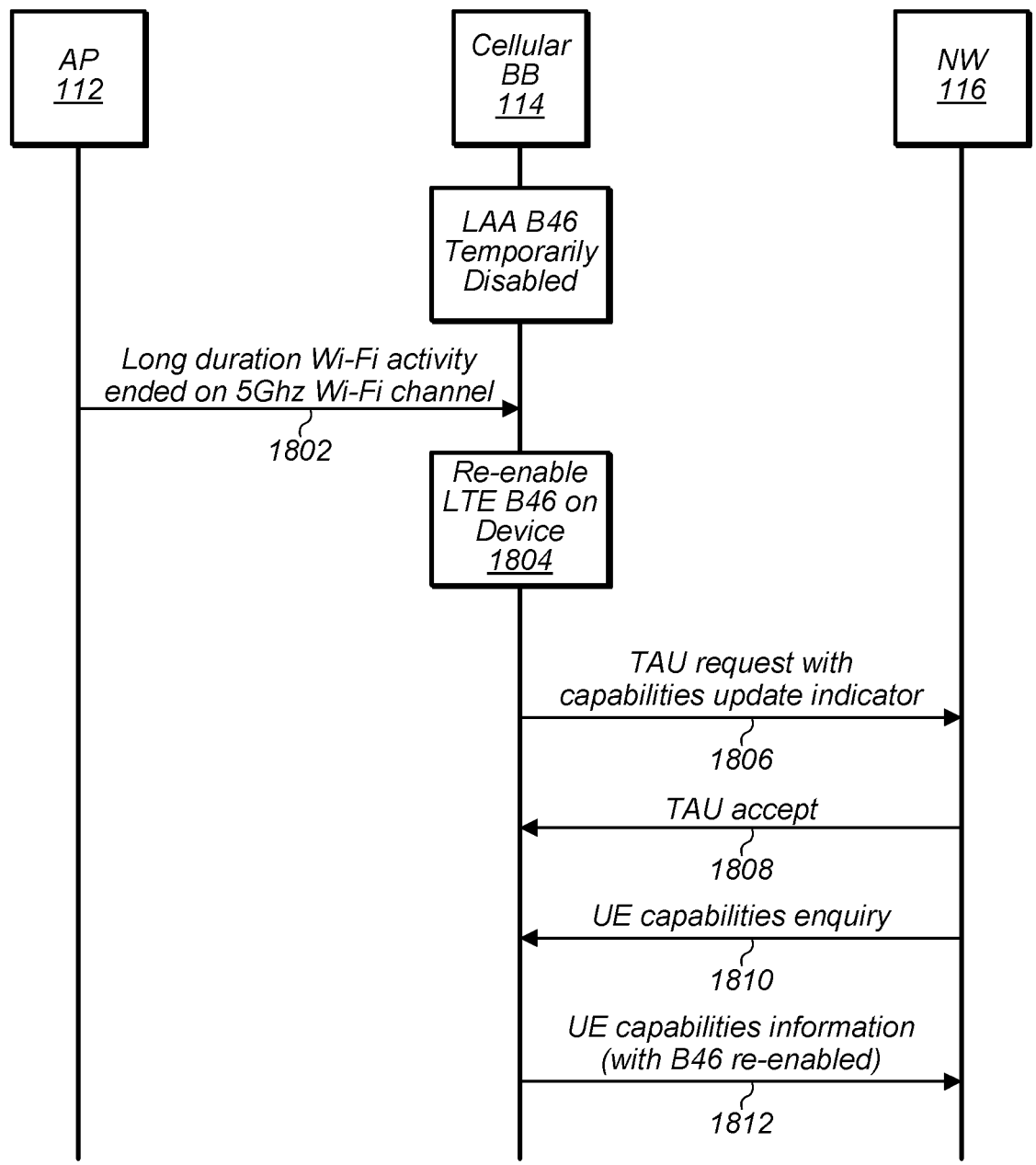

FIGS. 17-18 illustrate aspects of a scenario in which a long duration Wi-Fi activity is occurring, and in which no communication framework is specifically provided for indicating to the network coexistence considerations relating to use of unlicensed spectrum. As shown, cellular BB 114 may be LAA B46 capable. In 1702, AP 112 may indicate to BB 114 that a long duration Wi-Fi activity has started on a 5 GHz Wi-Fi channel. In 1704, BB 114 may deactivate a LAA B46 SCC via vRLF if CA is currently active, and in 1706, BB 114 may disable LTE B46 on the device. In 1708, BB 114 may provide a tracking area update request with a capability update indicator set to true to the NW 116. In 1710, NW 116 may provide a TAU accept indication to BB 114. In 1712, NW 116 may provide a UE capabilities enquiry to BB 114. In 1714, BB 114 may provide UE capabilities information to the NW 116, indicating that the UE is not LAA B46 capable. Thus, the UE may have effectively temporarily disabled LAA B46, by indicating to the NW 116 that it is not B46 capable.

As shown in FIG. 18, following from FIG. 17, BB 114 may be LAA B46 capable but may have LAA B46 temporarily disabled (e.g., may have signaled to the NW 116 that it is not B46 capable). In 1802, AP 112 may indicate to BB 114 that the long duration Wi-Fi activity has ended on the 5 GHz Wi-Fi channel. In 1804, BB 114 may re-enabled LTE B46 on the device. In 1806, BB 114 may provide a tracking area update request with a capability update indicator set to true to the NW 116. In 1808, NW 116 may provide a TAU accept indication to BB 114. In 1810, NW 116 may provide a UE capabilities enquiry to BB 114. In 1812, BB 114 may provide UE capabilities information to the NW 116, indicating that the UE is LAA B46 capable. Thus, the UE may have effectively re-enabled LAA B46, by indicating to the NW 116 that it is B46 capable. Such a TAU may thus be used to affect whether a carrier on an unlicensed frequency band is used, e.g., depending on whether Wi-Fi activity on the unlicensed frequency band is occurring at the wireless device. For example, the wireless device may indicate that it is or is not capable of communicating on the unlicensed frequency band depending on whether Wi-Fi activity on the unlicensed frequency band is occurring at the wireless device.

Note that in some instances, e.g., if the TAU request does not trigger a capabilities enquiry from the network to the UE within a certain amount of time, the BB 114 may choose to detach from and re-attach to the NW 116, e.g., to force the NW 116 to recognize the updated UE capabilities information from the BB 114.

Figure 19:
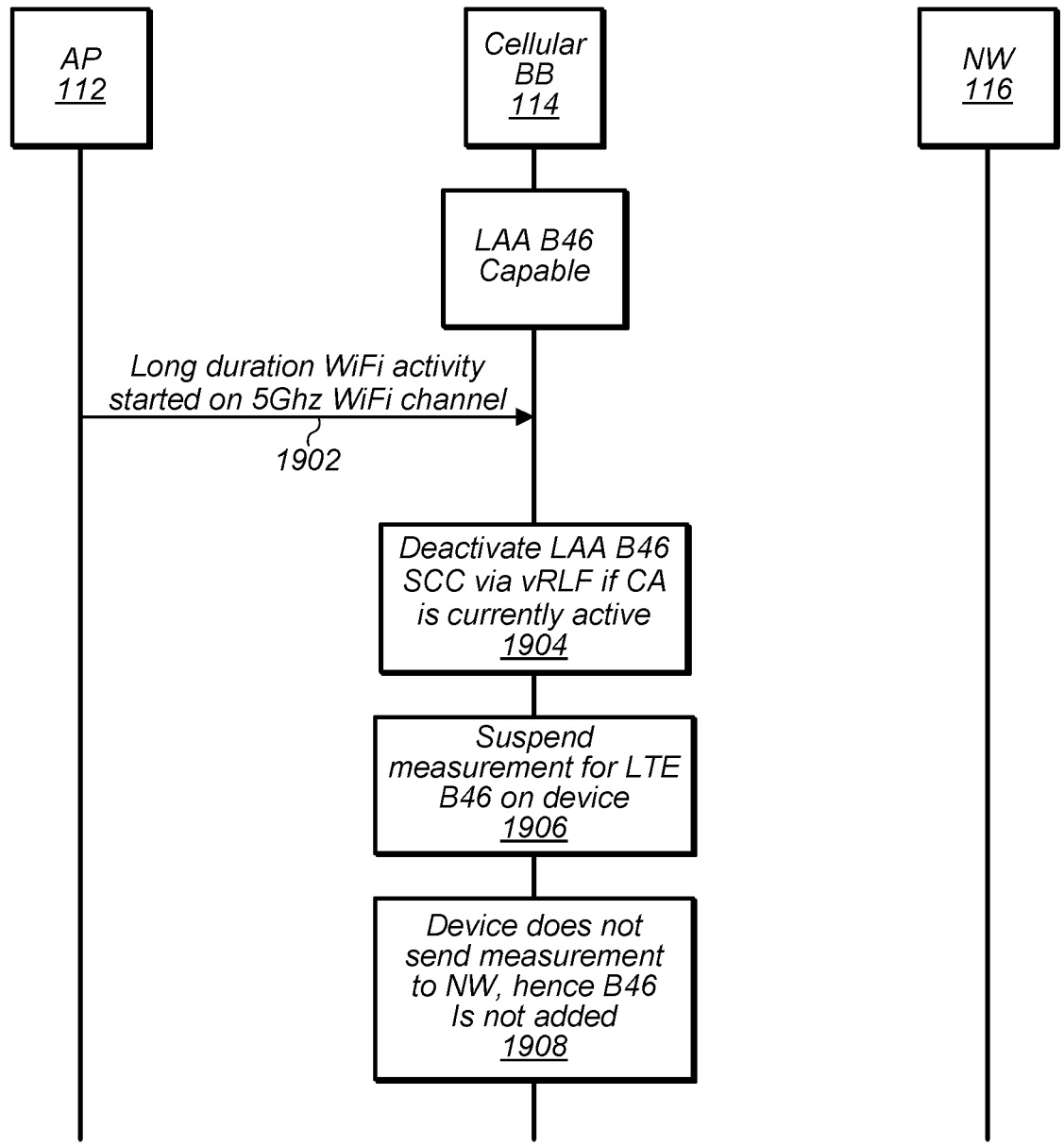
Figure 20:
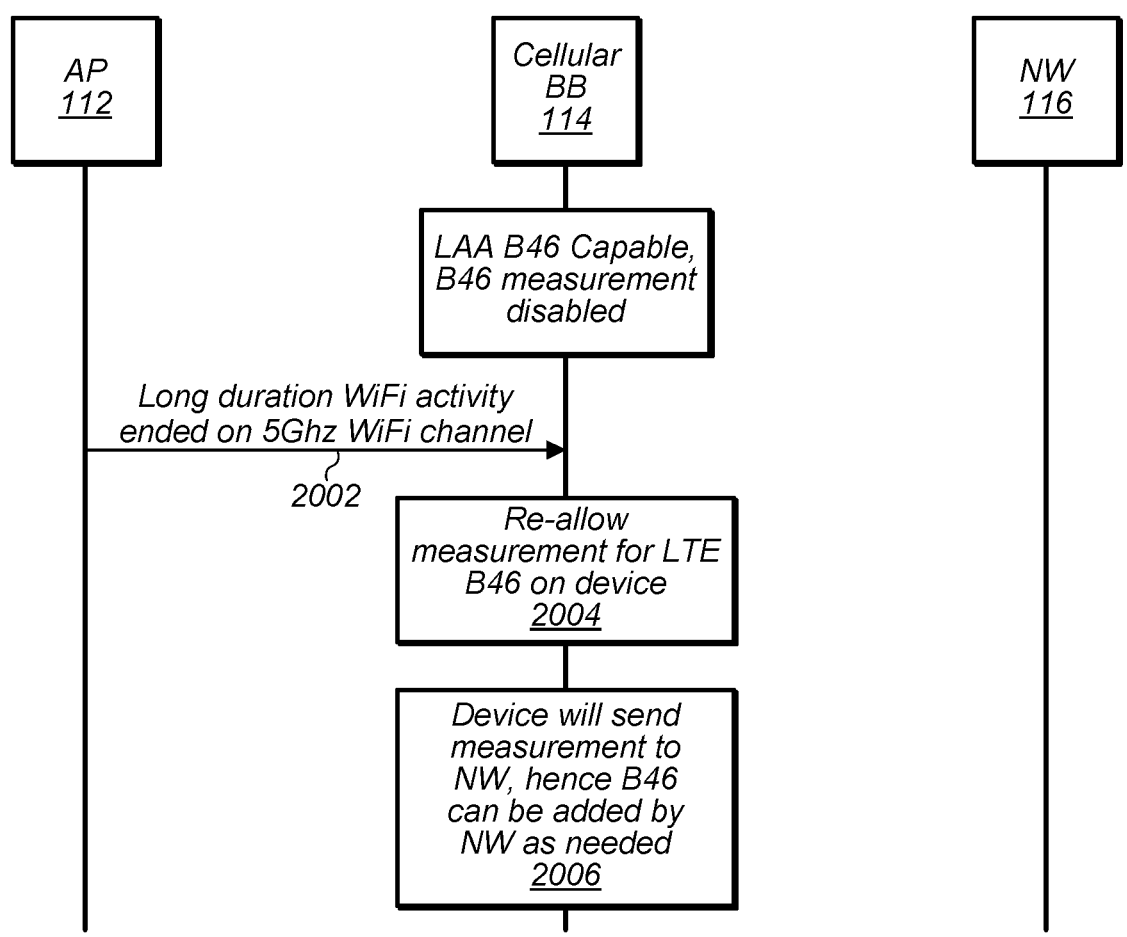

FIGS. 19-20 illustrate aspects of an alternate approach in a scenario in which a long duration Wi-Fi activity is occurring, and in which no communication framework is specifically provided for indicating to the network coexistence considerations relating to use of unlicensed spectrum. As shown, cellular BB 114 may be LAA B46 capable. In 1902, AP 112 may indicate to BB 114 that a long duration Wi-Fi activity has started on a 5 GHz Wi-Fi channel. In 1904, BB 114 may deactivate a LAA B46 SCC via vRLF if CA is currently active, e.g., may internally deactivate any carriers deployed on an unlicensed frequency band when Wi-Fi activity on the unlicensed frequency band is occurring at the wireless device. In 1906, the wireless device may further suspend measurements for LTE B46 (e.g., while Wi-Fi activity on the unlicensed frequency band is occurring at the wireless device, e.g., to prevent use of the unlicensed frequency band for cellular communication). Thus, in 1908, BB 114 may not send measurement information for B46 to the NW 116, and the NW 116 may accordingly not add a B46 SCC.

As shown in FIG. 20, following from FIG. 19, BB 114 may be LAA B46 capable but may have LAA B46 measurement temporarily disabled. In 2002, AP 112 may indicate to BB 114 that the long duration Wi-Fi activity has ended on the 5 GHz Wi-Fi channel. In 2004, BB 114 may re-allow measurement for LTE B46 on the device. In 2006, BB 114 may resume sending measurement information for B46 to the NW 116, and the NW 116 may accordingly be able to add a B46 SCC, e.g., as needed. Thus, measurements may be resumed on the unlicensed frequency band when Wi-Fi activity on the unlicensed frequency band is no longer occurring at the wireless device.

Figure 21:
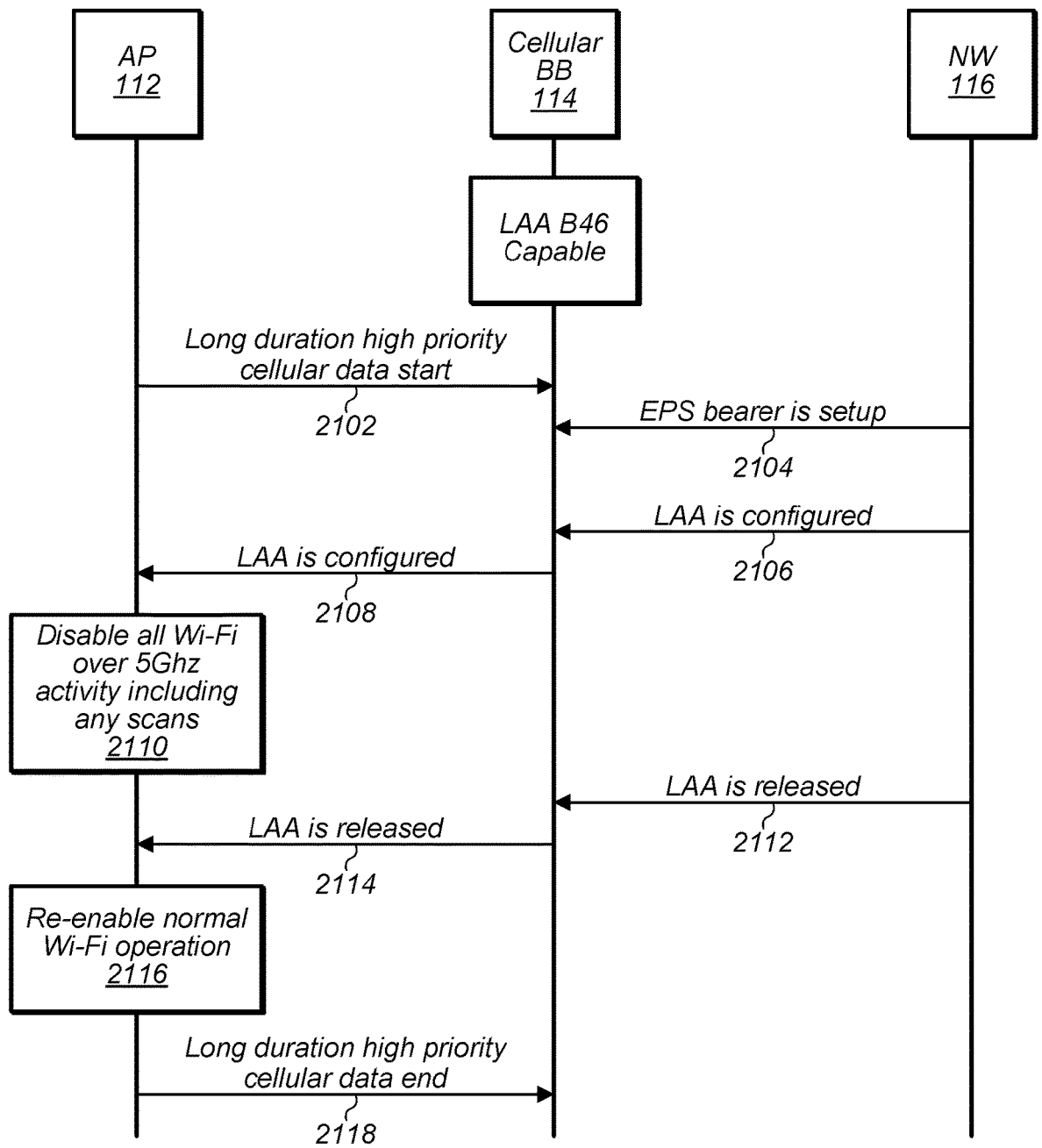

FIG. 21 illustrates aspects of a scenario in which a long duration high priority cellular activity is occurring using a carrier deployed on an unlicensed frequency band. As shown, cellular BB 114 may be LAA B46 capable. In 2102, AP 112 may indicate to BB 114 that a long duration high priority cellular data communication has started. In 2104, the NW 116 may inform BB 114 that an evolved packet service (EPS) bearer is setup. In 2106, the NW 116 may inform BB 114 that LAA is configured. In 2108, the BB 114 may inform AP 112 that LAA is configured. In 2110, AP 112 may disable all Wi-Fi over 5 GHz activity, e.g., including any scans. In 2112, the NW 116 may inform the BB 114 that LAA is released. In 2114, the BB 114 may inform the AP 112 that LAA is released. In 2116, the AP 112 may re-enable normal Wi-Fi operation. In 2118, the AP 112 may indicate to BB 114 that the long duration high priority cellular data communication has ended.

Thus, in this scenario, the wireless device may choose not to perform (e.g., may disable) Wi-Fi communications on the unlicensed frequency band while the high priority cellular activity is occurring using the carrier deployed on the unlicensed frequency band. The wireless device may again choose to perform (e.g., may re-enable) Wi-Fi communications on the unlicensed frequency band once the high priority cellular activity is no longer occurring using the carrier deployed on the unlicensed frequency band.

In the following further exemplary embodiments are provided.

One set of embodiments may include a method, comprising: by a wireless device: communicating with a cellular base station in accordance with an original communication configuration; determining that a communication activity is occurring at the wireless device that has a duration longer than a duration threshold; providing an indication to a cellular base station to modify the communication configuration with respect to operation in an unlicensed frequency band based at least in part on determining that a communication activity is occurring at the wireless device that has a duration longer than the duration threshold; and communicating with the cellular base station in accordance with a modified communication configuration.

According to some embodiments, the method further comprises: determining that the communication activity is complete; providing an indication to the cellular base station that modifying the communication configuration with respect to operation in the unlicensed frequency band is no longer needed based at least in part on determining that the communication activity is complete; and communicating with the cellular base station in accordance with the original communication configuration.

According to some embodiments, the communication activity comprises Wi-Fi communication on the unlicensed frequency band; wherein the indication to modify the communication configuration with respect to operation in an unlicensed frequency band comprises an indication to deactivate a carrier between the wireless device and the cellular base station that is deployed on the unlicensed frequency band.

According to some embodiments, the communication activity comprises a high priority cellular communication; wherein the indication to modify the communication configuration with respect to operation in an unlicensed frequency band comprises an indication to preferably perform the high priority cellular communication on a carrier between the wireless device and the cellular base station that is deployed on a licensed frequency band over a carrier between the wireless device and the cellular base station that is deployed on the unlicensed frequency band.

According to some embodiments, the method further comprises: evaluating wireless medium conditions for the unlicensed frequency band, wherein the indication is provided further based at least in part on the wireless medium conditions for the unlicensed frequency band.

According to some embodiments, the communication activity comprises a low priority cellular communication; wherein the indication to modify the communication configuration with respect to operation in an unlicensed frequency band comprises an indication to preferably perform the low priority cellular communication on a carrier between the wireless device and the cellular base station that is deployed on the unlicensed frequency band over a carrier between the wireless device and the cellular base station that is deployed on a licensed frequency band.

According to some embodiments, the communication activity comprises a high priority cellular communication, wherein the method further comprises: determining that the high priority cellular communication activity is occurring using a carrier between the wireless device and a cellular base station that is deployed on the unlicensed frequency band; and determining not to perform Wi-Fi communication on the unlicensed frequency band while the high priority cellular communication activity is occurring using the carrier between the wireless device and a cellular base station that is deployed on the unlicensed frequency band.

Another set of embodiments may include a method, comprising: by a wireless device: determining that the wireless device is performing Wi-Fi communication on an unlicensed frequency band; and providing an indication to a cellular base station to deactivate a carrier between the wireless device and the cellular base station that is deployed on the unlicensed frequency band based at least in part on determining that the wireless device is performing Wi-Fi communication on the unlicensed frequency band.

According to some embodiments, the method further comprises: determining that the wireless device is no longer performing Wi-Fi communication on the unlicensed frequency band; and providing an indication to the cellular base station to reactivate the carrier between the wireless device and the cellular base station that is deployed on the unlicensed frequency band based at least in part on determining that the wireless device is no longer performing Wi-Fi communication on the unlicensed frequency band.

Yet another set of embodiments may include a method, comprising: by a wireless device: determining a priority level of cellular data; and providing an indication to a cellular base station to regarding whether the wireless device has a preference for a carrier between the wireless device and the cellular base station that is deployed on a licensed frequency band or a carrier between the wireless device and the cellular base station that is deployed on an unlicensed frequency band for the cellular data based at least in part on the priority level of the cellular data.

According to some embodiments, the method further comprises: evaluating wireless medium conditions for the unlicensed frequency band; wherein the indication is provided further based at least in part on the wireless medium conditions for the unlicensed frequency band.

According to some embodiments, the wireless device has cellular data of multiple priority levels, wherein the method further comprises: providing an indication to a cellular base station of the priority level of the cellular data; and receiving bearer information from the cellular base station for multiple data bearers at least in part in response to the indication of the priority level of the cellular data.

Still another set of embodiments may include a method, comprising: by a wireless device: determining that high priority cellular data is being communicated using a carrier between the wireless device and a cellular base station that is deployed on an unlicensed frequency band; and determining not to perform Wi-Fi communication on the unlicensed frequency band based at least in part on determining that high priority cellular data is being communicated using a carrier between the wireless device and a cellular base station that is deployed on an unlicensed frequency band.

A further exemplary embodiment may include a wireless device, comprising: an antenna; a radio coupled to the antenna; and a processing element operably coupled to the radio, wherein the device is configured to implement any or all parts of the preceding examples.

Another exemplary embodiment may include an apparatus, comprising a processing element configured to implement any or all parts of the preceding examples.

Yet another exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

A yet further exemplary set of embodiments may include an apparatus comprising means for performing any or all of the elements of any of the preceding examples.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a processor configured to cause a wireless device to:
communicate with a cellular base station in accordance with an original communication configuration;
determine that a communication activity is occurring at the wireless device that has a duration longer than a duration threshold;
provide an indication to the cellular base station to modify a communication configuration with respect to operation in an unlicensed frequency band based at least in part on determining that a communication activity is occurring at the wireless device that has a duration longer than the duration threshold; and
communicate with the cellular base station in accordance with a modified communication configuration.

2. The apparatus of claim 1, wherein the processor is further configured to cause the wireless device to:
determine that the communication activity is complete;
provide an indication to the cellular base station that modifying the communication configuration with respect to operation in the unlicensed frequency band is no longer needed based at least in part on determining that the communication activity is complete; and
communicate with the cellular base station in accordance with the original communication configuration.

3. The apparatus of claim 1,
wherein the communication activity comprises Wi-Fi communication on the unlicensed frequency band;
wherein the indication to modify the communication configuration with respect to operation in an unlicensed frequency band comprises an indication to deactivate a carrier between the wireless device and the cellular base station that is deployed on the unlicensed frequency band.

4. The apparatus of claim 1, wherein the communication activity comprises a high priority cellular communication, wherein the processor is further configured to cause the wireless device to:
evaluate wireless medium conditions for the unlicensed frequency band,
wherein the indication to modify the communication configuration with respect to operation in an unlicensed frequency band comprises an indication to preferably perform the high priority cellular communication on a carrier between the wireless device and the cellular base station that is deployed on a licensed frequency band over a carrier between the wireless device and the cellular base station that is deployed on the unlicensed frequency band,
wherein the indication is provided further based at least in part on the wireless medium conditions for the unlicensed frequency band.

5. The apparatus of claim 1,
wherein the communication activity comprises a low priority cellular communication;
wherein the indication to modify the communication configuration with respect to operation in an unlicensed frequency band comprises an indication to preferably perform the low priority cellular communication on a carrier between the wireless device and the cellular base station that is deployed on the unlicensed frequency band over a carrier between the wireless device and the cellular base station that is deployed on a licensed frequency band.

6. The apparatus of claim 1, wherein the communication activity comprises a high priority cellular communication activity, wherein the processor is further configured to cause the wireless device to:
    determine that the high priority cellular communication activity is occurring using a carrier between the wireless device and a cellular base station that is deployed on the unlicensed frequency band; and
    determine not to perform Wi-Fi communication on the unlicensed frequency band while the high priority cellular communication activity is occurring using the carrier between the wireless device and a cellular base station that is deployed on the unlicensed frequency band.

7. The apparatus of claim 1, wherein the communication activity comprises cellular communication of cellular data of multiple priority levels, wherein the processor is further configured to cause the wireless device to:
    provide an indication to the cellular base station of the multiple priority levels of the cellular data; and
    receive bearer information from the cellular base station for multiple data bearers at least in part in response to the indication of the multiple priority levels of the cellular data.

8. The apparatus of claim 1, wherein the processor is further configured to cause the wireless device to determine the duration of the communication activity based on one or more of:
    an expected length of the communication activity;
    a communication activity type of the communication activity; or
    an amount of time for which the communication activity has been occurring.

9. A wireless device, comprising:
    an antenna;
    a radio operably coupled to the antenna; and
    a processor operably coupled to the radio;
    wherein the wireless device is configured to:
        determine that the wireless device is performing Wi-Fi communication on an unlicensed frequency band;
        determine that the Wi-Fi communication has a duration longer than a duration threshold; and
        provide an indication to a cellular base station to deactivate a carrier between the wireless device and the cellular base station that is deployed on the unlicensed frequency band based at least in part on determining that the wireless device is performing Wi-Fi communication on the unlicensed frequency band and the determination that the duration is longer than the duration threshold.

10. The wireless device of claim 9, wherein the wireless device is further configured to:
    determine that the wireless device is no longer performing Wi-Fi communication on the unlicensed frequency band; and
    provide an indication to the cellular base station to reactivate the carrier between the wireless device and the cellular base station that is deployed on the unlicensed frequency band based at least in part on determining that the wireless device is no longer performing Wi-Fi communication on the unlicensed frequency band.

11. The wireless device of claim 9, wherein the wireless device is further configured to, at a different time:
    determine that high priority cellular data is being communicated using a carrier between the wireless device and a cellular base station that is deployed on the unlicensed frequency band; and
    determine not to perform Wi-Fi communication on the unlicensed frequency band based at least in part on determining that high priority cellular data is being communicated using a carrier between the wireless device and a cellular base station that is deployed on the unlicensed frequency band.

12. The wireless device of claim 11, wherein the wireless device is further configured to, at the different time:
    evaluate wireless medium conditions for the unlicensed frequency band,
    provide an indication to preferably switch communication of the high priority cellular data from the carrier between the wireless device and the cellular base station that is deployed on the unlicensed frequency band to a carrier between the wireless device and the cellular base station that is deployed on a licensed frequency based at least in part on the wireless medium conditions for the unlicensed frequency band.

13. The wireless device of claim 11, wherein the wireless device is further configured to, at the different time:
    determine that high priority cellular data is no longer being communicated using a carrier between the wireless device and a cellular base station that is deployed on the unlicensed frequency band; and
    perform Wi-Fi communication on the unlicensed frequency band based at least in part on determining that high priority cellular data is no longer being communicated using a carrier between the wireless device and a cellular base station that is deployed on the unlicensed frequency band.

14. The wireless device of claim 9, wherein the determination that the duration is longer than the duration threshold is based on one or more of:
    an expected length of the Wi-Fi communication;
    a communication activity type of the Wi-Fi communication; or
    an amount of time for which the Wi-Fi communication has been occurring.

15. A method, comprising:
    by a wireless device:
        determining a priority level of cellular data;
        determining a preference between a carrier that is deployed on a licensed frequency band or a carrier that is deployed on an unlicensed frequency band for the cellular data based at least in part on the priority level of the cellular data;
        providing an indication to a cellular base station of the preference between the carrier that is deployed on the licensed frequency band or the carrier that is deployed on the unlicensed frequency band for the cellular data; and
        providing an indication to the cellular base station to deactivate the carrier that is deployed on the unlicensed frequency band when the wireless device is performing Wi-Fi communication on the unlicensed frequency band for a duration greater than a duration threshold.

16. The method of claim 15, wherein the method further comprises:
    evaluating wireless medium conditions for the unlicensed frequency band;

wherein the preference is further determined based at least in part on the wireless medium conditions for the unlicensed frequency band.

17. The method of claim 15,
wherein the preference is for the carrier that is deployed on the licensed frequency band for a first priority level of cellular data,
wherein the preference is for the carrier that is deployed on the unlicensed frequency band for a second priority level of cellular data,
wherein the first priority level is higher priority than the second priority level.

18. The method of claim 15, wherein the wireless device has cellular data of multiple priority levels, wherein the method further comprises:
providing an indication to the cellular base station of the multiple priority levels of the cellular data; and
receiving bearer information from the cellular base station for multiple data bearers at least in part in response to the indication of the multiple priority levels of the cellular data.

19. The method of claim 15, wherein the method further comprises:
determining whether the wireless device is performing Wi-Fi communication on the unlicensed frequency band,
wherein the preference is further determined based at least in part on whether the wireless device is performing Wi-Fi communication on the unlicensed frequency band.

* * * * *